(12) United States Patent (10) Patent No.: US 6,466,329 B1
Mukai (45) Date of Patent: Oct. 15, 2002

(54) METHOD AND APPARATUS FOR MANAGING COPY QUALITY IN THE HARDCOPY OR SOFTCOPY REPRODUCTION OF EITHER ORIGINAL PAGES OR EXTRINSICALLY RECEIVED ELECTRONIC PAGE IMAGES

(75) Inventor: Shunichi Mukai, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/047,904

(22) Filed: Mar. 25, 1998

(30) Foreign Application Priority Data

Mar. 28, 1997 (JP) .............................................. 9-077365

(51) Int. Cl.[7] .............................................. G06F 13/00
(52) U.S. Cl. ..................... 358/1.15; 358/1.13; 358/1.18
(58) Field of Search ................................. 358/1.1, 1.12, 358/1.13, 1.14, 1.15, 1.16, 1.17, 1.18; 382/183, 264, 265, 306, 317

(56) References Cited

U.S. PATENT DOCUMENTS 5,243,381 A * 9/1993 Hube .......................... 355/204
5,444,518 A * 8/1995 Hashiguchi et al. ......... 355/201
5,448,375 A * 9/1995 Cooper et al. ............... 358/403
5,548,666 A * 8/1996 Yoneda et al. .............. 382/306
5,754,308 A * 5/1998 Lopresti et al. ............. 358/403
5,859,935 A * 1/1999 Johnson et al. ............. 382/317

FOREIGN PATENT DOCUMENTS

| JP | 08 331362 A | 12/1996 | |
| JP | 8-331362 | 12/1996 | .......... H04N/1/387 |
| JP | 9-37004 | 2/1997 | ............ H04N/1/00 |
| JP | 9-37004 | 12/1997 | |

* cited by examiner

*Primary Examiner*—Mark Wallerson
(74) *Attorney, Agent, or Firm*—David W. Victor; Konrad Raynes Victor & Mann LLP

(57) ABSTRACT

A digital MFP, upon capturing one page of an image, determines whether a graphic code indicating a page ID exists in the image. If a graphic code is found, the corresponding page ID is searched for in a database. If the page ID is found in the database, the scanned image just captured is discarded and, in place thereof, printing data associated with the page ID are retrieved in order to generate an image for printing it on paper. On the other hand, if a graphic code indicating a page ID is found in the scanned image but the corresponding page ID is not registered in the database, or if a graphic. code indicating the page ID is absent from the scanned image, the scanned image is printed on paper as in an ordinary copying operation.

31 Claims, 17 Drawing Sheets

Process of Master-page Printing

Original Duplicating Function (when page ID is found but no ID in Ref table)

Facsimile Transmission of Original Document (when page ID is found)

Facsimile Transmission of Original Document (when page ID does not exist)

METHOD AND APPARATUS FOR MANAGING COPY QUALITY IN THE HARDCOPY OR SOFTCOPY REPRODUCTION OF EITHER ORIGINAL PAGES OR EXTRINSICALLY RECEIVED ELECTRONIC PAGE IMAGES

FIELD OF THE INVENTION

This invention relates to a page-oriented reproduction apparatus which enables multiple sets of copies to be made or transmitted via a network while maintaining the quality of a scanned original or extrinsically received page image.

BACKGROUND OF THE INVENTION

In recent years, various kinds of information handling systems (IHS) have been developed and widely adopted in offices and homes. Examples of such information handling systems include personal computers (PCS) of a general purpose type. Computers of this type execute various application programs, such as word processing, spreadsheet, and communication programs, and may allow users to do jobs on a display screen (i.e., "desktop"). A computer user can also input data and edit documents by means of a keyboard and a mouse.

A printer is another example of an IHS by which edited data are placed onto paper. In this regard, a printer is considered a special purpose computer that must be instructed to place text, images, and the like on a page in precise detail. One approach has been to use a mark-up language embedded in the text and recognizable by the printer. The mark-up language itself comprises short commands and parameters interpreted by the printer control unit. This language is also known as a page description language (PDL). The language may be heavily formatted, stylized, or templated. This merely means that formatting function and complexity may be variously shared between the PDL and the printer controller. It should be appreciated that in today's world of diverse networks of clients and servers, page images with embedded PDL may be stored and transmitted within and without the network for serial or concurrent publication on diverse page-oriented output devices. These include bit-mapped-oriented raster image devices such as facsimile and video screens, in addition to vectored devices such as printers.

A still further example of information handling systems is a copier for reproducing original images read by a scanner onto paper. Whereas printers and facsimile machines handle printing information in a data format, such as PDL, which can be transferred on-line, conventional analog-type copiers optically copy scanned images as they are. On the other hand, digital copiers, which have recently become widely used, print scanned analog images by a digital electrophotographic method after the images have been digitized.

Copiers and conventional image facsimile machines use different methods of reproducing from printers and PS (PostScript) facsimile machines. In the former, images in the original document are captured by analog scan; degradation of the print quality in the output is unavoidable because the original data are distorted or lost in the course of scanning. On the other hand, there is no factor for degradation of the print quality in the data input process in the latter because the source data are digital, such as PDL data.

Multifunction peripherals (MFPs) that especially handle digital data also combine the functions of a printer, a facsimile machine, and a copier. These have been only recently introduced. When equipped with a communication interface, a digital MFP can operate in a network and exchange printing and reproducing information with other apparatuses. An MFP's functions include:

(1) Reading an image of an original document by a scanner and reproducing it on another sheet of paper. In making a reproduction, expansion/reduction, trimming, composition, and modification of images may be applied.

(2) Receiving on-line data from a PC connected by a cable for printing.

(3) Exchanging on-line data with a facsimile machine or a PC connected via a network, and printing received on-line data.

(4) Copying an image read by means of a scanner onto another sheet of paper and converting a read image into on-line data for further transmission on the network.

(5) Saving acquired printed information in the MFP's own local disk or a remote disk on the network.

With a digital MFP, a scanned image may, for example, be sent to a server machine (database server) via a network such as the Internet, an Intranet, or a LAN such as an Ethernet or token-ring network. In other words, the use of a digital MFP facilitates central control of user documents and files on the network at a particular server. Digital MFPs are now being developed and commercialized mainly by information equipment and copier manufacturers. For example, parts of Fuji Xerox's Able series of Fuji Xerox and Canon's Pixel series are digital MFPs. Among printers, products that implement some of the functions of digital MFPs have also been introduced. For example, Hewlett Packard announced in November 1996 a laser printer LaserJet 5Si copier of the type that can be operated in a LAN environment.

As previously mentioned, PDL is a language describing printed images to a page printer, such as a laser printer. More specifically, it is a language (expression protocol) indicating which parts of a page contain text characters and which parts contains graphic images. A printer generates a printed image in its internal memory in accordance with the PDL data, and processes it for printing. PDL also includes a protocol for describing bitmap data. Major PDLs include Hewlett Packard's PCL, Adobe's PostScript, Canon's LIPS, IBM's PAGES and IPDS, and many others.

Incidentally, there was heretofore a requirement to preserve the original print quality in reproducing a document and original texts. For instance, a user of a copier normally wants the quality of the original to be retained in the copy. When the image information is digital, as in PDL, there is no chance of the data being distorted or lost when sending/receiving information containing images. It will therefore be possible in such cases to maintain good print quality by means of PDL data that describe the original data of printout.

The printing methods used by copiers and conventional image facsimile machines are different from those used by printers and PS (PostScript) facsimile machines. In the former, an image of the original is captured by an analog scan, and thus degradation of the print quality in the output is unavoidable because some of the original data are distorted or lost in the course of scanning.

On the other hand, it is difficult to ensure the print quality of the original in reproductions obtained by means of copier or image facsimile machines that capture an image of the original by analog scanning. This is because errors in optical systems and noise are inevitably involved when the original image (which consists of analog data) is optically read by a scanner and digitized. Errors inherent in the AD conversion may also be involved, particularly when a copy of a master is used as an original for copying and a copy so obtained is further copied, and the error and noise contents increase each time so that the quality is degraded to far below the print quality of the original. While a master needs to be reproduced accurately, the control of the master would be quite a job if it were brought out every time a copy was made. The problem of print quality similarly exists when a facsimile machine transmits an original, or when a document is scanned for filing in a database server.

SUMMARY OF THE INVENTION

It is an object of this invention to provide an improved reproduction apparatus and a method of controlling the same for reproducing text or images from an original document obtained by image scanning.

It is another object to provide an improved copier of a type in which an original document is received page by page for copying and transmission to a network, and which enables multiple sets of copies to be made and transmitted to the network while maintaining original document quality.

The foregoing objects are believed satisfied by a method and apparatus for managing a page-responsive hardcopy and softcopy reproduction and retransmission facility in which the facility includes a page-oriented storage arrangement. The method steps include electronically imaging a hardcopy original page or receiving an electronic page image from an extrinsic source. Next, it is necessary to ascertain from the electronic page image the presence of page identification indicia. After that, a comparison match is made between any detected indicia with indicia representing addressable page images recorded in the storage arrangement. In the absence of any ascertained identification indicia or in the presence of a comparison indicia mismatch, a hardcopy reproduction or a softcopy transmission of the electronic page image is conducted. Lastly, in the presence of a comparison indicia match, the previously recorded electronic image with the same indicia is accessed from the storage arrangement, and the accessed image is either reproduced in hardcopy or transmitted in softcopy.

In the event of a comparison mismatch of indicia, the electronic page image may be written into the storage facility as indexed by its page identification indicia and the facility operated in an adaptive mode. This adaptive mode would extend to all recurrences of hardcopy or softcopy requests for the same page or other pages recorded in the storage arrangement.

DETAILED DESCRIPTION OF THE INVENTION

Figure 1:
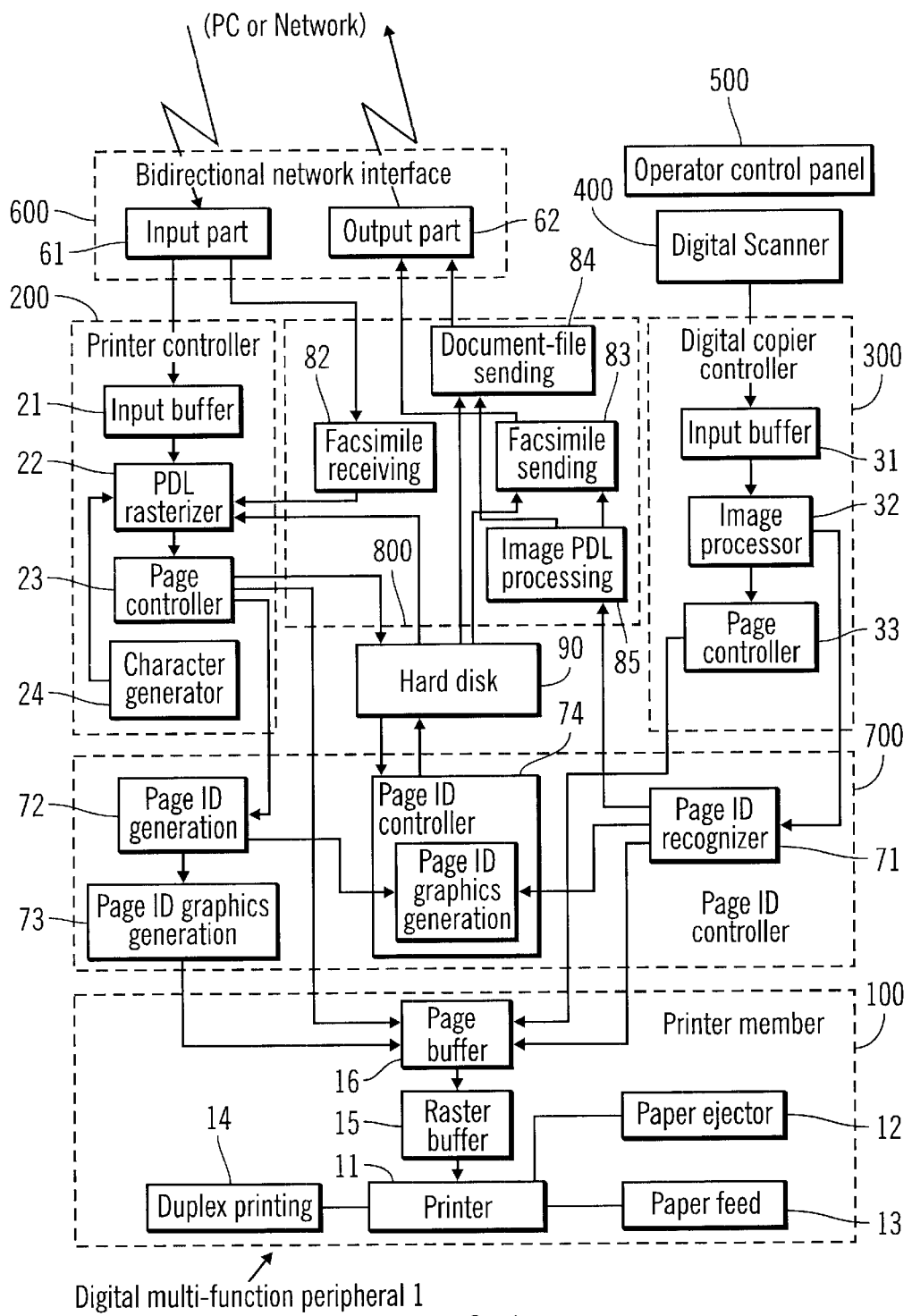
FIG. 1 schematically shows the hardware configuration of a typical digital MFP embodying this invention.

A master-page printing function is presumed to be included in a digital MFP. It should be understood that the "master page" (or simply "master") here is an original document used for printing in multiple sets or for transmission to a facsimile machine or database server.

A digital MFP usually receives printing data of the master page in the form of a printing request from a PC connected by a cable or a client PC connected to a network. Alternatively, a printing request may be received in the form of data by facsimile transmission from a facsimile machine (or other digital MFP) connected to a network (public communication line). Here, the printing data are handled in the form of digital data used in a description language called PDL (Page Description Language), rather than in the form of scanned images. Printing data in PDL format can be processed by a computer and saved in an external storage device, such as a hard disk or optical disk.

A digital MFP, in printing a master page, assigns unique identification information (hereinafter called the page ID) to the page and stores the printing data in association with the assigned page ID in its own external storage (e.g., a hard disk). A graphic code indicating the assigned page ID is printed at a predetermined position on the sheet of paper on which the master page is printed. The graphic code may be, for example, in the form of a bar code, and should preferably be printed on the periphery of the paper so as not to disturb the original printed image. Alternatively, the graphic code may be an invisible embedded image or an image placed on the reverse side of the original page. Incidentally, it is assumed that the printing data in PDL format to be stored as a master page describes an original printout of the page.

Copying Operations

A digital MFP captures the image of the original document to be copied page by page in the first stage of the copying operation. When one page of the image has been captured, it is determined whether or not a graphic code indicating a page ID exists in the scanned image. If such a graphic code is found, the corresponding page ID is searched for the apparatus's own external storage. If the page ID is found in the external storage, the scanned image just captured is discarded and, instead, printing data associated with the page ID are retrieved from the external storage for printing by an ordinary printing data processing operation. The retrieved printing data are PDL data describing the original document; thus, the original print quality of the printed image is ensured.

When a graphic code indicating a page ID is found in the scanned image but the corresponding page ID has not been registered in the digital multifunctional peripheral's own external storage, the scanned image is copied to paper unchanged by means of an ordinary copying operation. This would occur in cases where the original document to be copied is a master printed by another digital MFP, or where the original to be copied has already been discarded from the peripheral's own external storage because it was a master printed by the same digital MFP a long time before and has since expired.

When a graphic code indicating the page ID does not exist in the scanned image, that is, when the original to be copied is not originally a master, the scanned image is copied to paper unchanged by means of an ordinary copying operation.

Because a scanned image generally contains errors or noise introduced during the scanning, the print quality is progressively degraded by iteration of the scanning process. It should be noted that the print quality of the original is retained according to this invention as a result of using already stored printing data in preference to the scanned image just read in.

An image is reproduced page by page from PDL data stored in the external storage device. The sequence in which pages are reproduced is totally independent of the sequence in which the PDL data were stored. Therefore, even if the sequence of pages is changed, or particular pages are selected or neglected, the copies can be reproduced in the sequence of reordered pages. Also, even when some of the master pages are modified and replaced, the modified pages can be reproduced precisely in the same order of the copied document. In addition, even when master pages are mixed with pages that are not a master; the pages of the master are exactly reproduced based on the printed data of the original. There is no need for the operator to worry about replacement of the master pages or mixture with pages that are not a master.

Facsimile Operation

When a pair of digital MFPs are connected by a network such as the Internet and an Intranet, for example, one of the digital MFPs is capable of sending a facsimile original to the other in a similar manner to that in which a conventional facsimile machine sends facsimile data to another.

The transmitting digital MFP captures an image of the transmission original page by page from a scanner. When one page of the image has been captured, it is determined whether or not a graphic code indicating a page ID exists in the scanned image. If such a graphic code is found, the corresponding page ID is searched for in the multifunctional peripheral's own external storage. If the page ID is found in the external storage, the scanned image just captured is discarded and, instead, printing data associated with the page ID are retrieved for transmission to the receiving digital MFP in the PDL format. The transmitted PDL data describes the original printed image, and thus the original print quality of the original is ensured at the receiving facsimile machine.

When a graphic code indicating a page ID is found in the scanned image but the corresponding page ID is not registered in the digital multifunctional peripheral's own external storage, the scanned image is packed into the PDL format/*/for transmission to another digital MFP. This would be the case when a transmitted original is master printed by another digital MFP, or when the transmitted original has already been discarded from the peripheral's own external storage because it was master printed by the same digital MFP a long time before and has since expired.

When a graphic code indicating a page ID does not exist in the scanned image, that is, when the original to be copied was not originally a master page, the scanned image is packed into a PDL format for transmission to another digital MFP.

Two advantages are involved in sending the scanned data in a PDL format rather than as an image. First, the network communication load is reduced because data in a printer description language (PDL) generally occupy a smaller volume than image data. Second, the same print quality as on the transmission side is maintained in the print processing on the receiving side because the receiving digital MFP newly generates an image by using the source data.

The receiving digital MFP may independently assign a page ID to each page of the received original and store the PDL data of each page in its own external storage. In this case, a received facsimile original is printed as a new master page on the receiving side so that the print quality at the time of reception (i.e., the original quality) will be maintained every time the original is copied. It should be noted that the print quality of the original is also maintained in reproducing an image in facsimile operation as a result of stored printed data being used in preference to the scanned image just read in.

Filing Operation in the Database on the Network

As described in the preceding paragraphs, the digital MFP of this invention assigns a page ID to a page that is master printed and saves the printing data in the external storage in a data format, such as PDL, that can be transmitted on-line.

On the other hand, a user may wish to save (file) documents handled in its digital MFP centrally in a groupware server (e.g., a database server) on a network, such as the Internet. In such a case, the user may designate the address of the database server and set a document to be filed on a scanner for transmission in a manner similar to facsimile operation (i.e., file transfer).

The transmitting digital MFP captures an image of a document to be filed page by page from a scanner. When one page of the image has been captured, it is determined whether or not a graphic code indicating a page ID exists in the scanned image. If such a graphic code is found, the corresponding page ID is searched for in the digital multifunctional peripheral's own external storage. If the page ID is found in the external storage, the scanned image just captured is discarded and, instead, printing data associated with the page ID are retrieved from the external storage for file transfer to the destination database server unchanged in the PDL format. The document file to be filed consists of PDL data describing the original printed image, and thus the original print quality of the image is ensured.

When a graphic code indicating a page ID is found in the scanned image but the corresponding page ID is not registered in the multifunctional peripheral's own external storage, the scanned image is packed into a PDL format for transfer to the database server. This would be the case when an original to be copied is master-page printed by another digital MFP, or when the original to be copied has already been discarded from its own external storage because it was a master that was printed by the same digital MFP a long time before and has since expired. When a graphic code indicating a page ID does not exist in the scanned image, that is, when the document to be filed is not originally a master page, the scanned image is packed into a PDL format for transfer to the database server.

It should be noted that the print quality of the original is also maintained in reproducing an image in the document filing operation since the stored printing data are used in preference to the scanned image just read in.

Because the data are sent in PDL format rather than as an image, the data volume of the file is reduced and the network communication load is reduced. Also, the database server can maintain the original print quality in printing a saved document file.

Incidentally, the PDL data in the external storage are transferred page by page. The sequence in which pages are transferred is totally independent of the sequence in which the PDL data were stored. Thus, even if the pages are reordered or a particular page is selected or neglected, the file is transferred in the sequence of the reordered pages. Also, even when some of the pages are modified and replaced by the new master pages, the modified pages can be transferred precisely in the same order of the reordered original document. In addition, even when a master pages is mixed with pages that are not master pages, the pages of the master are transferred exactly in the form of the printing data of the original. There is no need for the operator to worry about replacement of the master page or mixture with pages that are not a master during the filing operation.

To summarize, in executing a copy/print operation, the digital MFP (reproduction apparatus) of this invention preferentially outputs printing data saved in its own external storage rather than the scanned image just read in when the image captured by the scanner is a master page. Thus, the original print quality is maintained by using the master page as an original.

Referring now to FIG. 1, there is shown a hardware configuration of a typical digital MFP 1 embodying this invention. The digital MFP 1 comprises a printer member 100, a printer controller 200, a digital copier controller 300, a facsimile controller 800, a digital scanner 400, an operator control panel 500, a bidirectional network interface 600, a page ID controller 700, and a hard disk 90 as a large-capacity storage medium. Each hardware block will be described hereinafter.

The printer member 100 is a module for transferring printed characters and images to paper and comprises a printer 11, a paper ejector 12, a paper feeder 13, a duplex printer 14, a raster buffer 15, and a page buffer 16. The page buffer 16 receives a printed image developed into a bitmap page by page for storage therein, while the raster buffer 15 retrieves several scanned lines of printed information from the page buffer 16 for temporary storage therein. The printer 11 successively prints several scanned lines of the print information taken from the raster buffer 15 on paper that is fed from the paper feeder 13. A completed page is fed to the paper ejector 12, which may include a collator for ordering the pages of documents sequentially in multiple sets of copies, in addition to a stacker for simply piling up copy papers. In addition, when duplex printing is specified, the duplex printer 14 turns over a sheet of paper on one side of which printing is completed on one side for redelivery to the printer 11.

The printer controller 200 is a module for implementing the printing function of the digital MFP 1 and comprises an input buffer 21, a PDL rasterizer 22, a page controller 23, and a character generator 24. The input buffer 21 is a memory device for temporarily storing the printing data received by the bidirectional network interface 600. Printing data received externally are normally in PDL format. The character generator 24 is a device for generating character images corresponding to alphanumeric characters, which are expressed by character code in PDL data. The PDL rasterizer 22 is a device for developing printing data in PDL format into bitmaps in order to generate printed images while using the character images supplied by the character generator 24.

The page controller 23 is a device for evolving a printing job to proceed page by page. More specifically, the page controller 23 sends a printed image developed into a bitmap on a page basis by the PDL rasterizer 22 to a printing process (the page buffer in this case) as a print image for printing, or saves one page of the printing data on the hard disk 90 unchanged in PDL format for storage therein. The printing data are stored on the hard disk 90, for instance, when a master page is printed. The page controller 23 requests the page ID generator 72 (to be described later) to assign a page ID upon printing a master page.

The digital scanner 400 is a module for reading images of a original to be copied, and comprises an optical system (not shown) for irradiating the original with a light (e.g., a laser light) in order to read the images by reflecting light therefrom, and an electronic system (not shown) for converting the images into digital data (all well known in the art). The digital scanner 400 may be provided with a feeder (not shown) for feeding multiple sets of pages of the original to the optical system page by page.

The digital copier controller 300 is a module for implementing the copying function of the digital MFP 1 and comprises an input buffer 31, an image processor 32, and a page controller 33. The input buffer 31 is a memory device for temporarily storing scanned images captured as digital data by the digital scanner 400. The image processor 32 is a device for developing scanned images into bitmap form. The image processor 32 can also perform various types of image processing common to a digital copier (e.g., enlargement/reduction of an image, trimming and modification of an image, etc.). The page controller 33 is a device for evolving a copying job to proceed page by page and is adapted to send out each page of image data, developed into a bitmap, to a printing process (the page buffer in this case) as a print image.

The facsimile controller 800 is a module for implementing the facsimile function of the digital MFP 1 and comprises a facsimile receiver 82, a facsimile sender 83, a document file sender 84, and an image PDL processor 85.

The facsimile receiver 82 is a device for receiving transmitted facsimile data through the bidirectional network interface 600 (input part 61). For instance, facsimile data sent from another digital MFP is transmitted normally in PDL format, as in the case of print data. Thus, the facsimile receiver 82 is capable of performing a printing processing similar to that in the printer operation, as well as saving data on the hard disk 90 page by page by delivering facsimile data to the PDL rasterizer 22.

The facsimile sender 83 is a device for sending facsimile data to a destination through the bidirectional network interface 600 (output part 62). The facsimile data to be sent have either been stored on the hard disk 90 or are read from the original document to be transmitted by the digital scanner 400. In the former case, the facsimile sender 83 may simply deliver the facsimile data read from the hard disk 90 to the output part 62 unchanged because the facsimile data are in PDL format, which is transferrable on-line. In the latter case, the scanned image of the original is delivered to the facsimile sender 83 after it has been developed into a bitmap in the image processor 32 and enclosed in PDL format by the image PDL processor 85.

The document file sender 84 is a device for transferring a document file to a computer system (e.g., a database server) on the network through the bidirectional network interface 600 (output part 62). A document file for transmission either has been stored on the hard disk 90, as in the case of the facsimile data, or is read by the digital scanner 400 from a document to be filed. In the former case, the document file sender 84 may simply deliver the facsimile data read from the hard disk 90 to the output part 62 unchanged because the facsimile data are in PDL format, which is transferrable on-line. In the latter case, the scanned image of the document to be filed is delivered to the document file sender 84 after it has been developed into a bitmap in the image processor 32 and enclosed in PDL format by the image PDL processor 85.

The operator control panel 500 is a module for allowing an operator to input various settings and operation commands for copying, printing, facsimile, and document filing operations. For instance, device operations including the number of copies, the size of the copies, the degree of enlargement/reduction, duplex printing, and master-page printing, as well as setting of the recipient of a facsimile transmission or file transfer of a document, which may be done interactively on the operator control panel 500.

The bidirectional network interface 600 is a module for implementing interconnection with external equipment, and comprises an input part 61 and an output part 62. The interface 600 has a PC cable connected thereto or is connected to various networks, including the Internet and Intranets. In the latter case, the digital MFP 1 is capable of communicating with PCs, server machines (e.g., a database server), facsimile machines, and other digital MFPs on the networks. The input part 61 is a device for receiving data transmitted over the networks, and the received data are delivered to the input buffer 21 or the facsimile receiver 82. The output part 62 is a device for preparing data to be sent over the networks, and the data to be sent are delivered from the facsimile sender 83 or the document file sender 84. Incidentally, the interface 600 is assumed to be capable of handling data that conform to the PDL format.

The page ID controller 700 is a module for controlling page-based printing, copying, facsimile, and document filing operations by using a page ID and comprises a page ID recognizer 71, a page ID generator 72, a page ID graphic generator 73, and a page ID controller 74.

The page ID is identification information unique to each page. When master-page printing is specified in a print request which is detected by the printer controller 200, the page controller 23 requests the page ID generator 73 to assign a page ID (to be described later). The page ID generator 72, upon receiving the request, assigns an unused page ID to the page to be master-page printed and leaves the generation of a graphic code indicating the assigned page ID to the page ID generator 73. The graphic code generated by the page ID generator 73 is delivered to the page buffer 16 together with the print image of the page sent by the page controller 23, as a result of which the graphic code is printed at a predetermined position on the sheet of paper that is printed as a master page. Incidentally, the graphic code indicating a page ID may be either a bar code placed at a predetermined position on the back of a page or any form of image, such as an embedded image invisible to humans or an image placed on the reverse of the original.

The page ID controller 74 is a device for controlling printing data page by page and is provided with a page ID reference table. When a page is printed as a master, the page is assigned a page ID and the printing data for that page are stored on the hard disk 90 (to be described later). At this time, the page ID controller 74 associates the assigned page ID with the storage address of the printing data for the page for registration in the page ID reference table. Incidentally, both the hard disk 90 and the page ID reference table in this embodiment are structured in first-in/first-out (FIFO) form so that the PDL data and the page ID of the master page are sequentially purged as they become old.

The page ID recognizer 71 is a device for detecting the presence of a graphic code indicating a page ID in the scanned image read by the digital scanner 400 (more precisely, a print image generated from the scanned image), and for recognizing the page ID if such a code is found.

When a scanned image contains a page ID, as is the case when the original or the like placed on the scanner 400 is a master page to be copied, the page ID recognizer 71 first searches the page ID reference table for the recognized page ID. If the page ID is found in the page ID reference table, the page ID controller 74 retrieves the printing data for the page from the corresponding storage address in the hard disk 90 to deliver it to the PDL rasterizer 22. As a result, the scanned image just read by the scanner 400 is discarded and, instead, the printing data retrieved from the hard disk 90 is printed on paper according to the printing process of the printer controller 200 (in the case of the facsimile operation and document filing operations, however, the printing data retrieved from the hard disk 90 are sent or transmitted in place of the scanned image, as will be described later).

On the other hand, when a scanned image contains a page ID that is not found in the page ID reference table, the page ID recognizer 71 delivers the print image, developed into a bitmap in the image processor 32, to the page buffer 16 unchanged. Consequently, the scanned image is processed according to an ordinary copy operation. However, the printed image developed into a bitmap in the image processor 32 is enclosed into the PDL format by the image PDL processor 85 for transmission. A situation in which the page ID is not found in the page ID reference table occurs when the copy original placed on the scanner 400 was master-page printed by another digital MFP. This also arises when the master-page printing occurred a considerable time before, as a result of which the corresponding PDL data on the hard disk 90 have already been lost due to the FIFO scheme. Correspondingly, the page ID has been removed from the page ID reference table.

Similarly, when the scanned image has no page ID, as is the case where the original to be copied placed on the scanner 400 is not a master page, the page ID recognizer 71 delivers the print image developed into a bitmap in the image processor 32 to the page buffer 16 unchanged, and consequently the scanned image is processed according to an ordinary copying operation. It should be fully understood here that the page ID recognizer 71 includes a function of using already stored print data in preference to the scanned image just read in.

Operation of Digital MFP

While the preceding sections have described the hardware of the digital MFP 1 that embodies this invention, this section will describe the operation of this invention along with the operation of the digital MFP 1.

"Master-page printing" shall mean an operational mode for printing on paper which allows subsequent use of the document as a master page (hereinafter simply called "master page" or "master"). In the master-page printing in this embodiment, a unique page ID is assigned to a page that is assumed to be a master page. The page is printed along with a graphic code indicating the page ID, while the printing data for the page are stored in association with the assigned page ID. Because a graphic code indicating the page ID is printed at a predetermined position on the paper that is master-page printed, the original printing data can be retrieved by recognizing the graphic code of the page ID from the scanned data of the master page. The printing data are normally digital data in PDL format so that there is no concern about degradation upon saving and retrieving the data from the hard disk 90. Master-page printing is a preprocess that should preferably be included in implementation of this invention.

Master-page printing is specified by placing a command to that effect at the top of the printing data on the side of a printing client PC in the network (a client PC can normally specify the settings of a digital MFP connected to itself by using a printer driver). Alternatively, master-page printing may be specified interactively on the desktop screen or the operator control panel 500 of an external computer system connected by a cable or via a network to the interface 600. Printing data (PDL data) sent from a PC connected by a cable/network or facsimile data (PDL data) received by facsimile are used as printing data for master-page printing.

Figure 2:
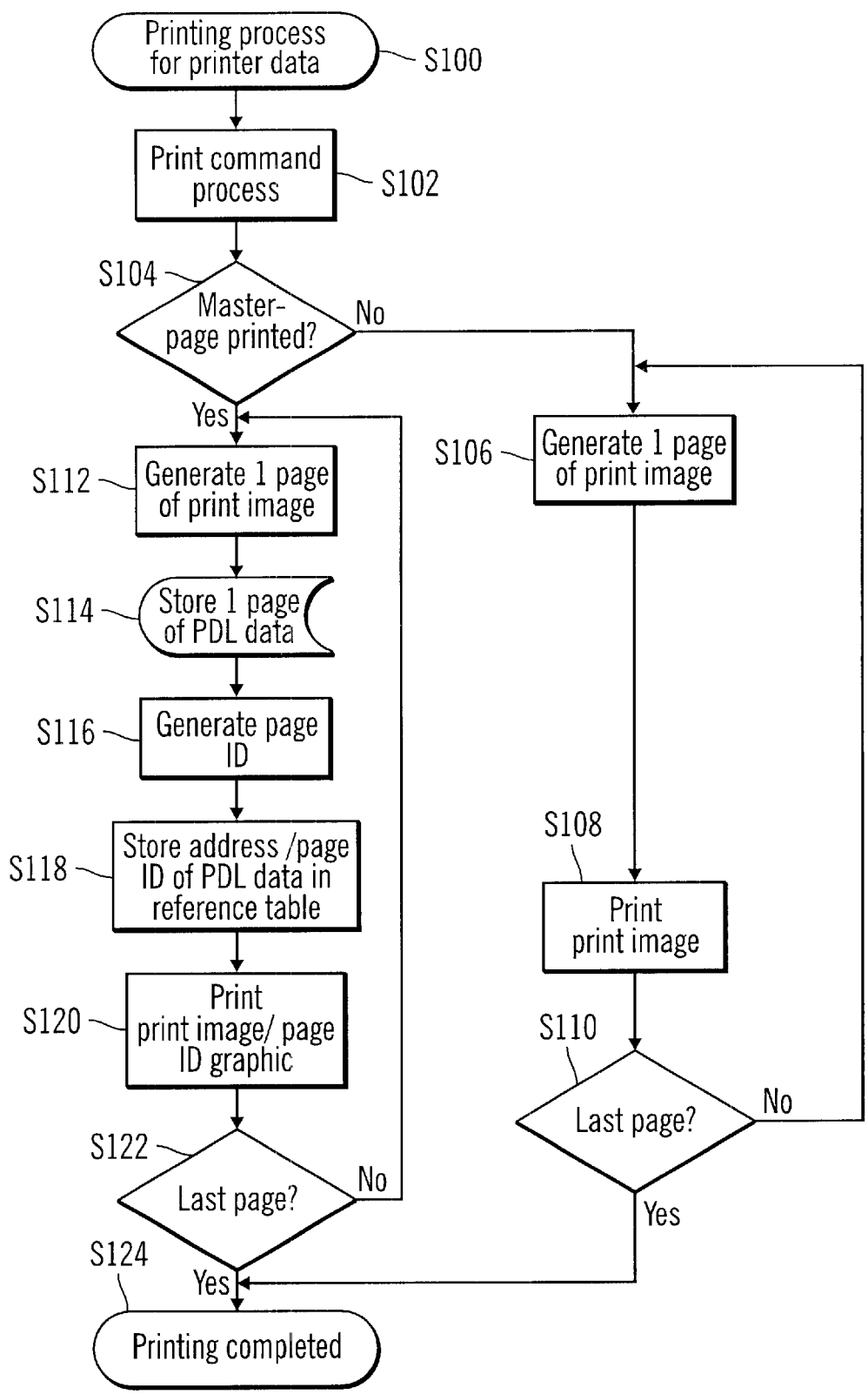
FIG. 2 is a flowchart showing the processing steps in master-page printing using printing data sent from a client PC connected by a cable.

Referring now to FIG. 2, there is shown a flowchart of the processing steps in master-page printing when printing data are sent from an external PC connected by a cable/network. This process begins when a print request is received from a PC (step S100). The digital MFP 1 first interprets the content of the received print command (step S102) and then determines whether master-page printing is currently specified (step S104). If master-page printing is not specified, an ordinary page printing process is used. Accordingly, the printing data sent in PDL format is developed into a bitmap to generate a print image of one page (step S106) for printing on paper (step S108). This page-print process is repeated until the last page is reached (step S110). Incidentally, cooperative operations of each hardware block in the printing process are described in section A.

On the other hand, when master-page printing is specified, the printing data sent in PDL format are developed into a bitmap to generate a print image of one page (step S112), and the printing data of this page are stored on the hard disk 90 (step S114). The page ID generator 72 then generates a page ID of this page (step S116). The page ID controller 74 then records the page ID in the page ID reference table in association with the storage address of the printing data on the hard disk 90 (step S118). The page ID graphic generator 73 then generates a graphic code indicating the page ID assigned to the page and delivers it to the page buffer 16. As a result, the print image generated from the printing data in PDL format will be printed on the master page, together with the graphic code (step S120). The master-page printing process in the above steps S112, ..., S120 is repeated until the last page is reached (step S122). The process is complete when the last page has been printed (step S124).

Figure 3:
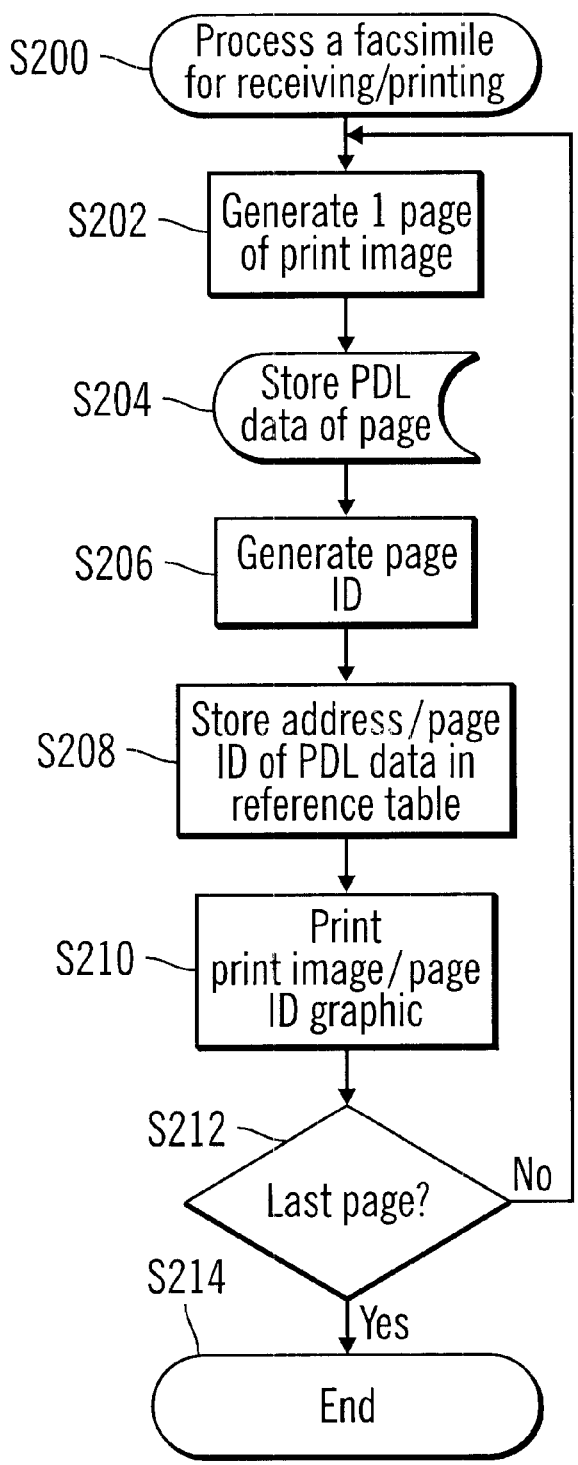
FIG. 3 is a flowchart showing the processing steps in master-page printing by using received data by facsimile transmission.

Referring now to FIG. 3, there is shown a flowchart of the processing steps in master-page printing when data received by facsimile are used. The process begins when facsimile data are received via the network (step S200). While master-page printing may be arbitrarily specified and canceled in this embodiment, a facsimile reception is always followed by master-page printing (provided that this invention is practicable even if master-page printing upon facsimile reception is designed as an option). The received facsimile data in PDL format are developed into a bitmap to generate a print image of one page (step S202), and the facsimile data for this page are stored on the hard disk 90 (step S204).

The page ID generator 72 then generates a page ID of this page (step S206). The page ID controller 74 then records the page ID in the page ID reference table in association with the storage address of the facsimile data on the hard disk 90 (step S208). The page ID graphic generator 73 then generates a graphic code indicating the page ID assigned to the page and delivers it to the page buffer 16. As a result, the print image generated from the facsimile data in PDL format is printed on the master page, together with the graphic code (step S210). The master-page printing process in the above steps S202, ..., S210 are repeated until the last page is reached (step S212). The process is complete when the last page has been printed (step S214).

Figure 4:
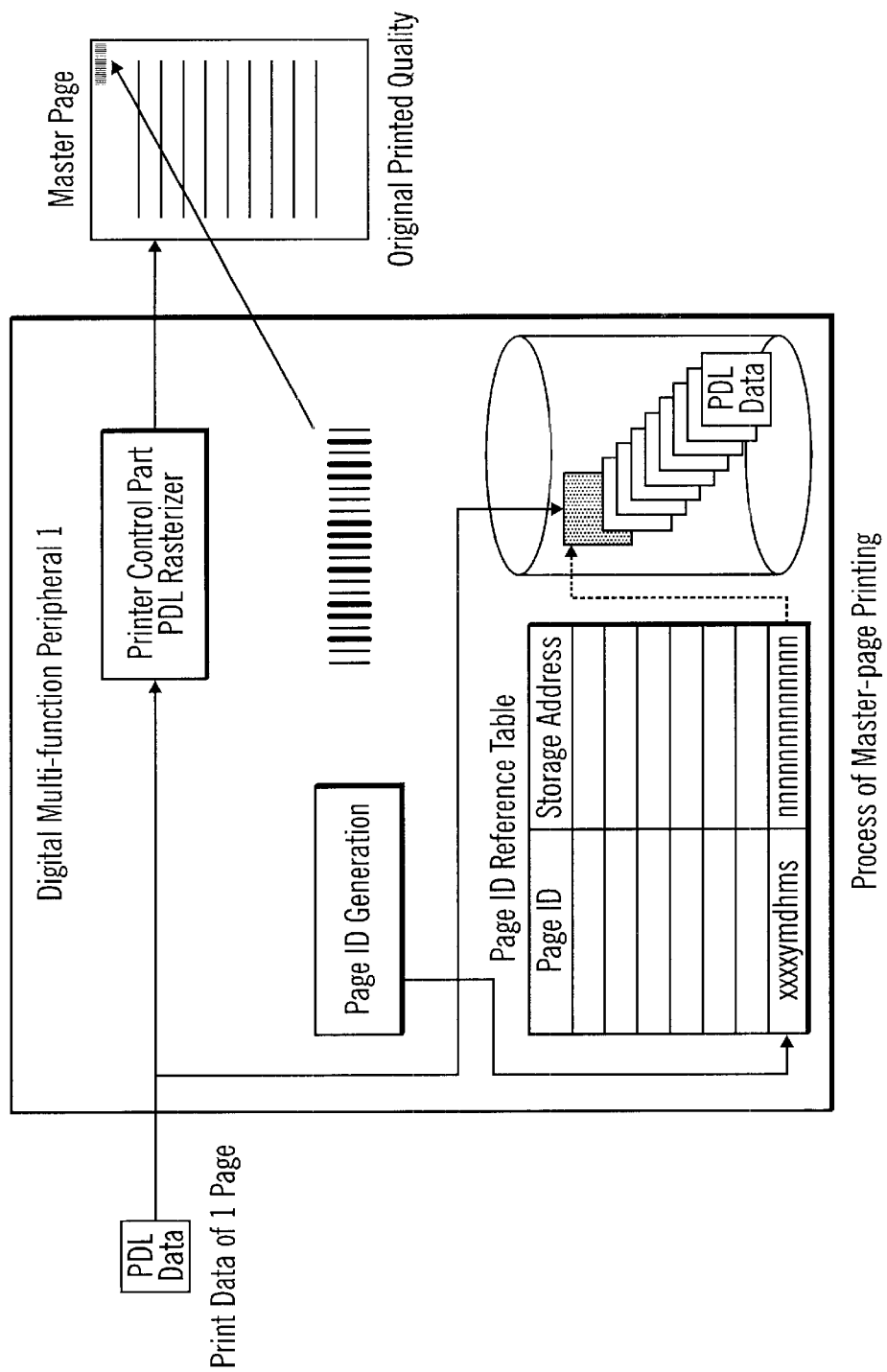
FIG. 4 generally illustrates master-page printing.

Referring now to FIG. 4, master-page printing is illustrated. When one page of PDL data is received in the form of either a print request from the PC or a facsimile, the PDL data are first stored on the hard disk 90. Next, when a page ID is assigned to this page by the page ID generator 72, the page ID is recorded in the page ID reference table in association with the storage address of the PDL data on the hard disk 90. The received PDL data are developed into a bitmap by the PDL rasterizer 22 to generate a print image. A graphic code indicating the assigned page ID is generated by the page ID graphic generator 73 and sent to the printer member 100 along with the print image. As a result, the graphic code is placed at a predetermined position (e.g., in the top right corner) on the master page.

An example of the graphic code is a bar code, as shown in the figure. Degradation of the print image is avoided by printing the graphic code on the periphery of the master page. By using an invisible embedded image as a graphic code in place of the bar code, the graphic code may be printed in any place without degrading the printed image. The possibility of degrading the printed image may be further reduced if the graphic code is printed on the reverse side of the master page.

Copying Operation

A characteristic of the digital MFP 1 is that it is capable of copying and printing while maintaining the original print quality of the original captured by image scanning. This characteristic is demonstrated in the copying operation.

Figure 5:
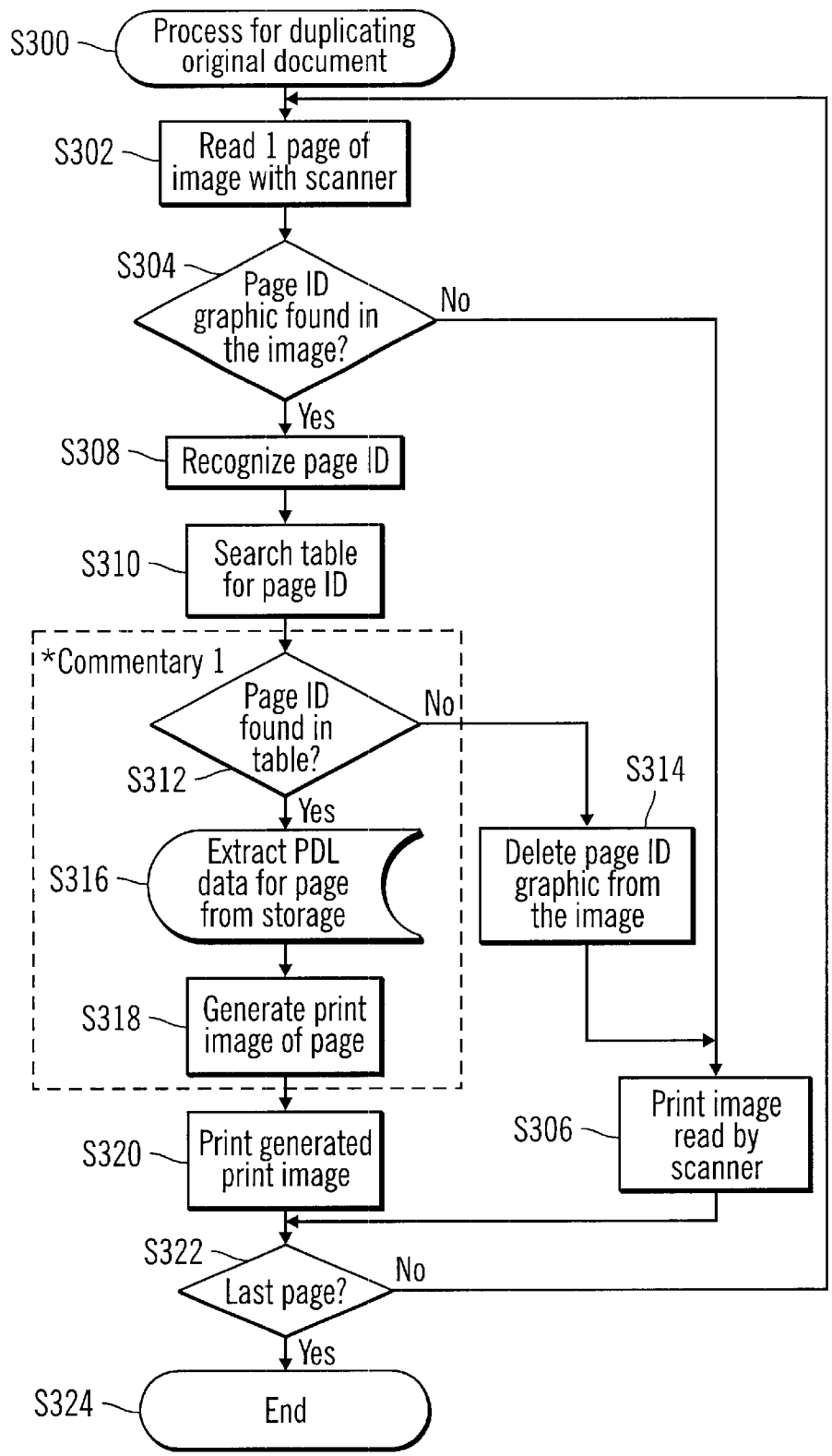
FIG. 5 is a flowchart showing the process steps of a copying operation performed by the digital MFP 1.

Referring now to FIG. 5, there is shown a flowchart of the processing steps of the copying operation of the digital MFP 1. The process begins with an instruction to start copying, while setting an original to be copied is placed on the digital scanner 400 (step S300). The digital scanner 400 reads the image of the original document page by page, while the digital copier controller 300 processes the scanned image to successively generate pages of print image (step S302).

The page ID recognizer 71, upon receiving one page of the print image, first determines whether a graphic code indicating the page ID exists in the print image (step S304). If a graphic code indicating the page ID is not found in the print image, that original to be copied is no longer a master page; that is, the digital MFP 1 does not contain therein the printing data of that page. Thus, the page ID recognizer 71 delivers the print image prepared from the scanned image to the printer member 100 unchanged. As a result, one page of the scanned image is copied to paper according to an ordinary copying operation (step S306). Incidentally, cooperative operations of each hardware block in the copying process are described in section A. When a graphic code indicating the page ID is found in the print screen, the page ID recognizer 71 further recognizes the page ID indicated by the graphic code (step S308) and searches the page ID reference table for that page ID (step S310).

When the page ID exists in the print image but is not recorded in the page ID reference table, the hard disk 90 does not have currently stored therein the printing data corresponding to that page. Thus, the page ID recognizer 71 delivers the print image prepared from the scanned image to the printer member 100 unchanged. As a result, one page of the scanned image is copied to paper according to an ordinary copying operation (steps S312, . . . ,S306). A situation in which the page ID is not found in the page ID reference table occurs when the original to be copied placed on the scanner 400 is a master page printed by another digital MFP, or when the master-page printing was done on the same digital MFP a considerable time before. As a result, the corresponding PDL data on the hard disk 90 have been lost due to the FIFO scheme and, correspondingly, the page ID has also been discarded from the page ID reference table. In this case, it is preferable to copy to paper with the graphic code portion deleted from the print image because the graphic code on the print image makes no sense at all to the digital MFP 1 (step S314).

When the page ID existing in the print image is found in the page ID reference table, this means that an original to be copied placed on the scanner 400 is a master and that the printing data thereof are recorded in the digital MFP 1. Thus, the page ID controller 74 retrieves the printing data from the corresponding storage address on the hard disk 90 to deliver them to the PDL rasterizer 22 (step S316). The PDL rasterizer 22 develops the printing data in PDL format into a bitmap to generate one page of a printed image which is sent to the printer member 100 as a print image by the page controller 23 (step S318). As a result, a printing process is performed by the printer controller 200 to print an image, which is equivalent to a master page on paper (step S320). The scanned image just read in by the scanner 400 is discarded, and therefore an ordinary copying operation is not performed.

When the printing process for one page has been completed with step S320 or S306, it is determined whether the copying process has been completed down to the last page; that is, whether any original to be copied is still placed on the digital scanner 400. If an original to be copied is still left on the scanner 400, the system returns to step S302 and the above process is repeated. If all originals to be copied have been passed through the same process, the routine ends (step S324).

Figure 6:
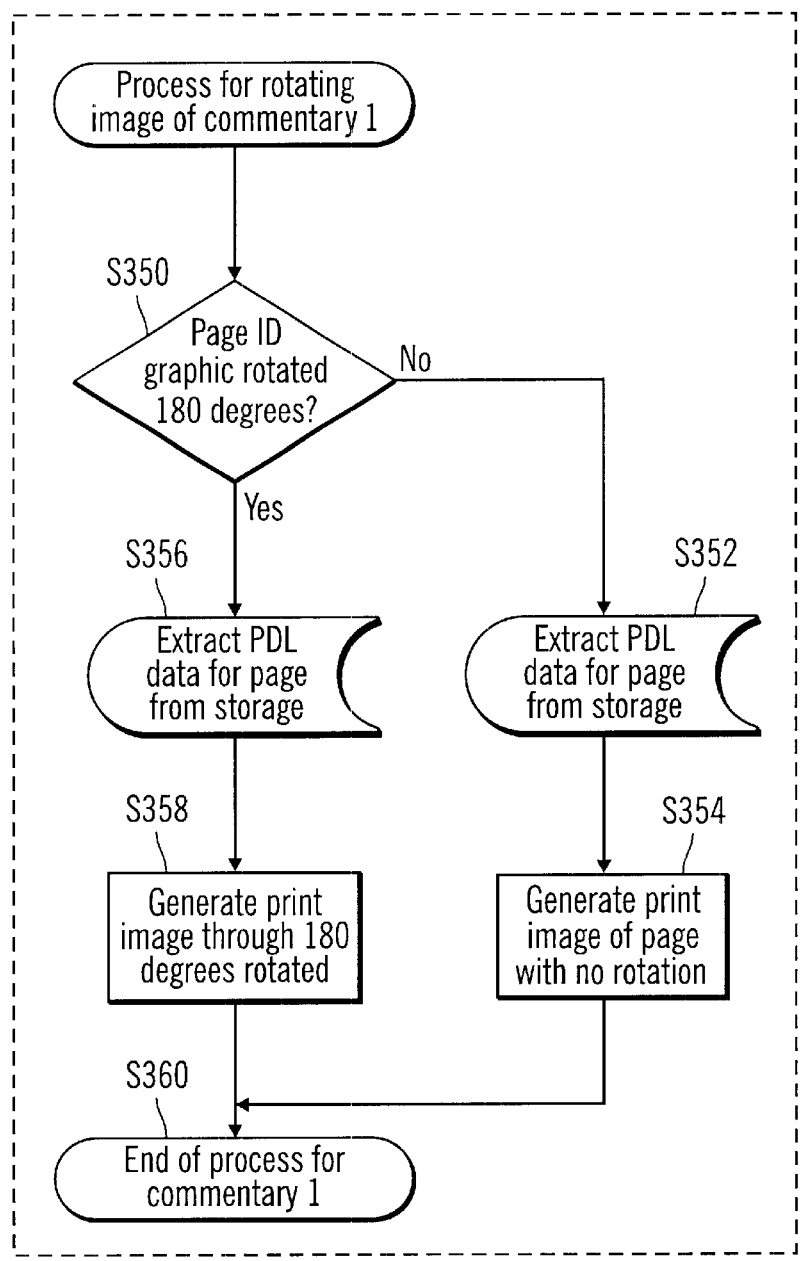
FIG. 6 is a flowchart showing the process steps of a copying operation performed by the digital MFP 1 and, more particularly, another example of operations performed when the master page is placed with its orientation rotated through 180 degrees.

An operator may wish to copy an original to paper rotated through 180 degrees (i.e., upside down). According to the digital MFP 1 of this embodiment, a print output can be obtained with the same orientation as the original and with the original print quality maintained by simply placing the master page on the digital scanner 400 with the form rotated through 180 degrees. This process, however, requires that steps S312, S316, and S318, which are surrounded by a dotted line in the flowchart of FIG. 5, be replaced with the steps in FIG. 6, which will be described below.

The page ID recognizer 71, upon finding the page ID recognized on the print image in the page ID reference table, determines whether the graphic code indicating the page ID is rotated through 180 degrees on the print screen (step S350).

If the graphic code is not rotated through 180 degrees, that is, if the master page is placed on the scanner 400 with the normal orientation, the page ID controller 74 retrieves printing data from the corresponding storage address on the hard disk 90 to deliver it to the PDL rasterizer 22 (step S352). The PDL rasterizer 22 then develops the printing data in PDL format into a bitmap unchanged to generate one page of a printed image, which is sent to the printer member 100 as a print image by the page controller 23 (step S354). As a result, a print image which is equivalent to the master page is printed on paper with the normal orientation.

On the other hand, when the graphic code is rotated through 180 degrees, that is, when the master page is placed on the scanner 400 with an orientation opposite the normal orientation, the page ID controller 74 retrieves printing data from the corresponding storage address on the hard disk 90 to deliver it to the PDL rasterizer 22 (step S352). However, the PDL rasterizer 22 develops the printing data in PDL format into a bitmap with 180-degree rotation to generate a printed image and delivers it to the printer member 100 (step S358). As a result, a printed output is obtained with the orientation rotated through 180 degrees as in the original to be copied and with the original print quality maintained.

Figure 7:
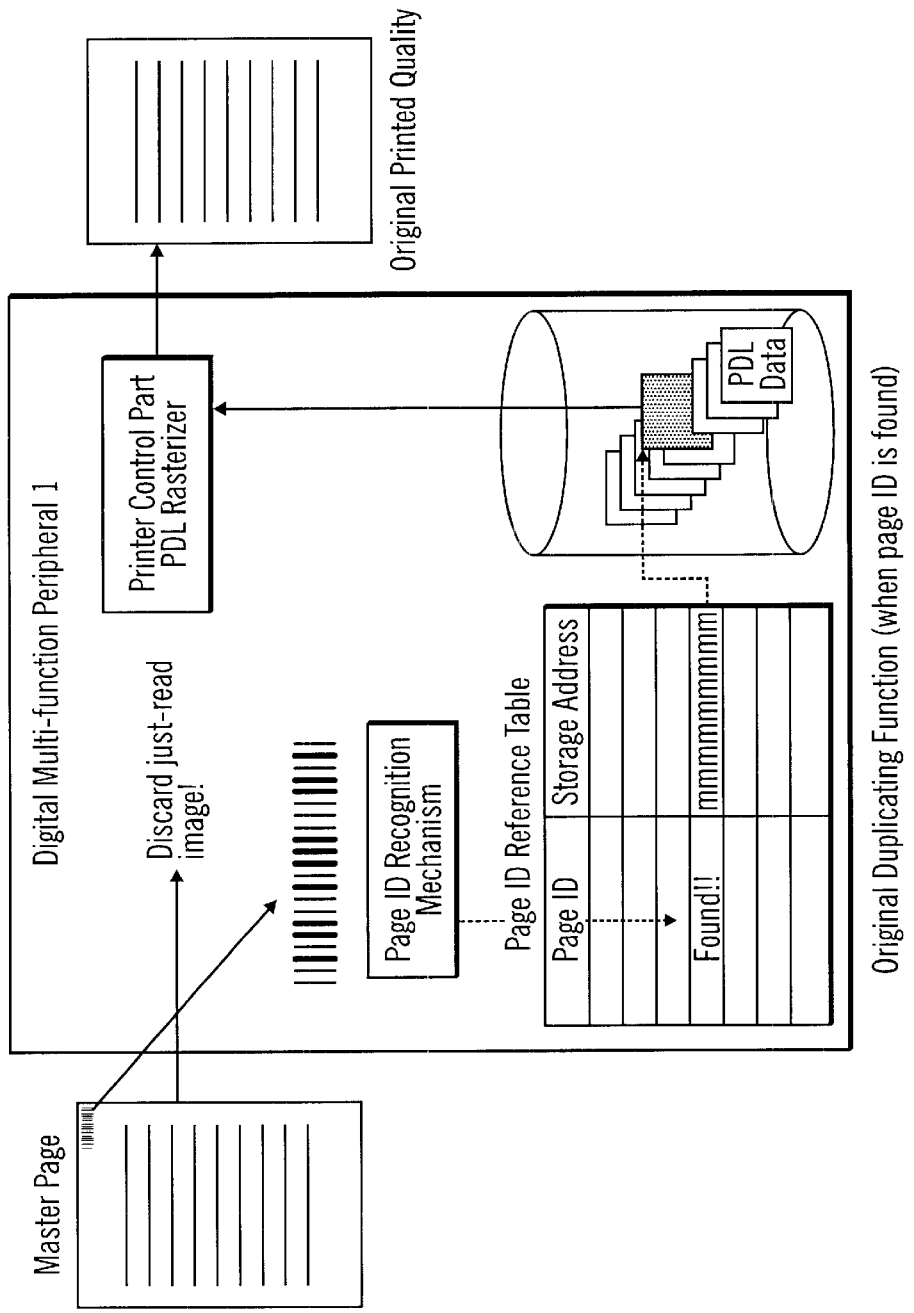
FIG. 7 generally illustrates a copying operation performed by the digital MFP 1 and, more particularly, an operation where a master page with a page ID registered in the page reference table is received.

Referring now to FIG. 7, there is shown the copy operation when a master page having a page ID which is registered in the page ID reference table is received. When an image of one page of an original is read by the digital scanner 400, the image processor 32 processes the scanned image to form one page of print image, and the page ID recognizer 71 then determines whether a graphic code indicating the page ID (a bar code in this example) exists in the print image. If a graphic code is found, the page ID reference table is searched for the page ID indicated by the graphic code. If the page ID is found, the scanned image just read from the scanner 400 is discarded and, in place thereof, PDL data retrieved from the corresponding storage address on the hard disk 90 are delivered to the printer controller 200 (PDL rasterizer 22). As a result, a printing process is performed by the printer controller 200 rather than a copying process by the digital copier controller 300. That is, the printing process is performed in the printer member 100 on the basis of the PDL data read from the hard disk 90, and consequently the printed image on paper will have the original print quality which is equivalent to that of the master page.

Figure 8:
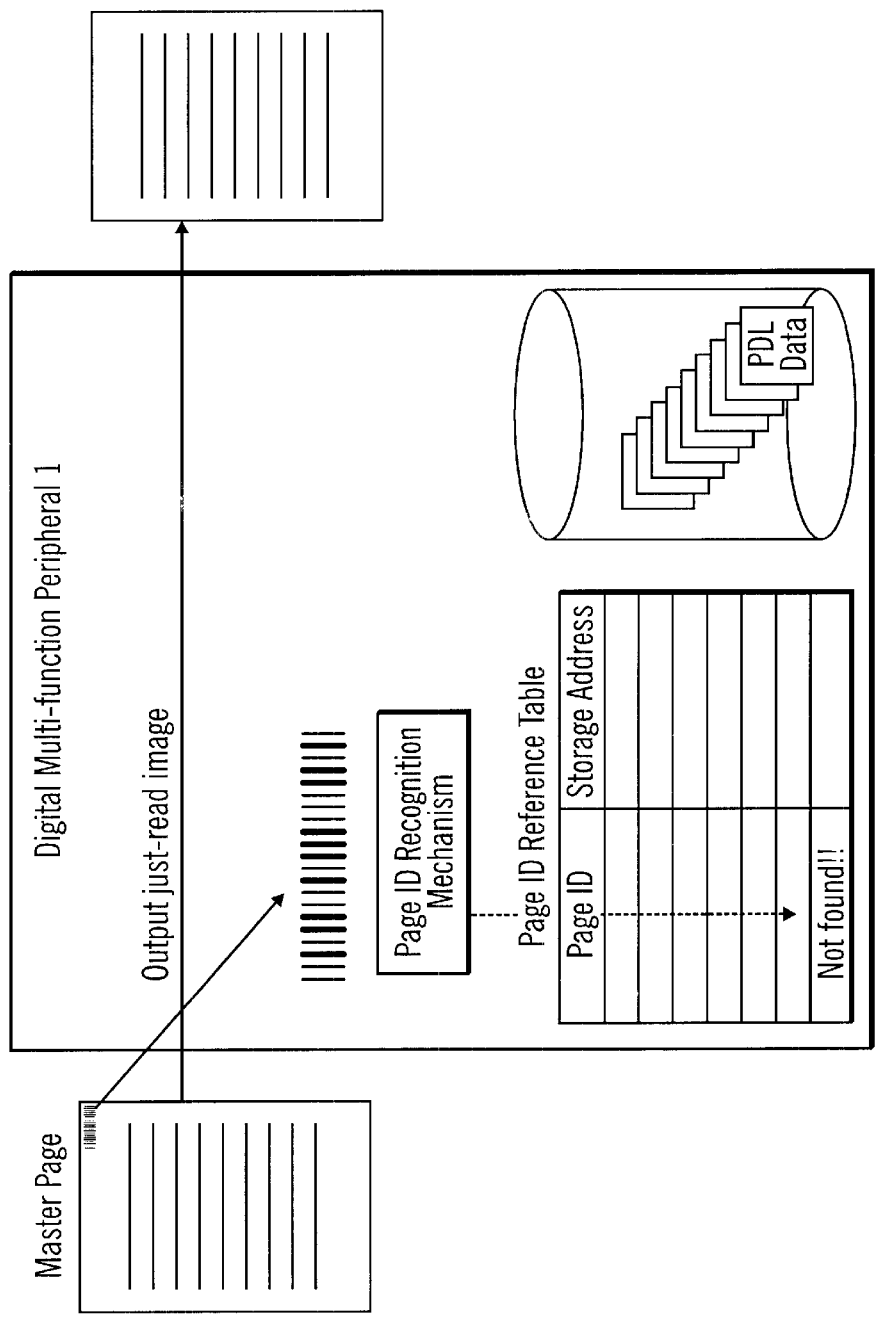
FIG. 8 generally illustrates a copying operation performed by the digital MFP 1 and, more particularly, an operation where a master page with a page ID not registered in the page reference table is received.

Referring now to FIG. 8, there is shown a copying operation when a master page with a page ID not registered in the page ID reference table is received. When an image of one page of the original is read by the digital scanner 400, the image processor 32 processes the scanned image to form one page of print image, and the page ID recognizer 71 then determines whether a graphic code indicating the page ID (a bar code in this example) exists in the print image.

If a graphic code is found, the page ID reference table is searched for the page ID indicated by the graphic code. If the page ID is not found, a print image generated from the scanned image captured by the digital scanner 400 is delivered unchanged to the printer member 100 for execution of a copying operation by the digital copier controller 300. A situation in which the page ID is not found in the page ID reference table occurs when the master page was printed by another digital MFP or when it was printed a considerable time before. As a result, the corresponding PDL data on the hard disk 90 were lost owing to the FIFO scheme and, correspondingly, the page ID has been removed from the page ID reference table.

Figure 9:
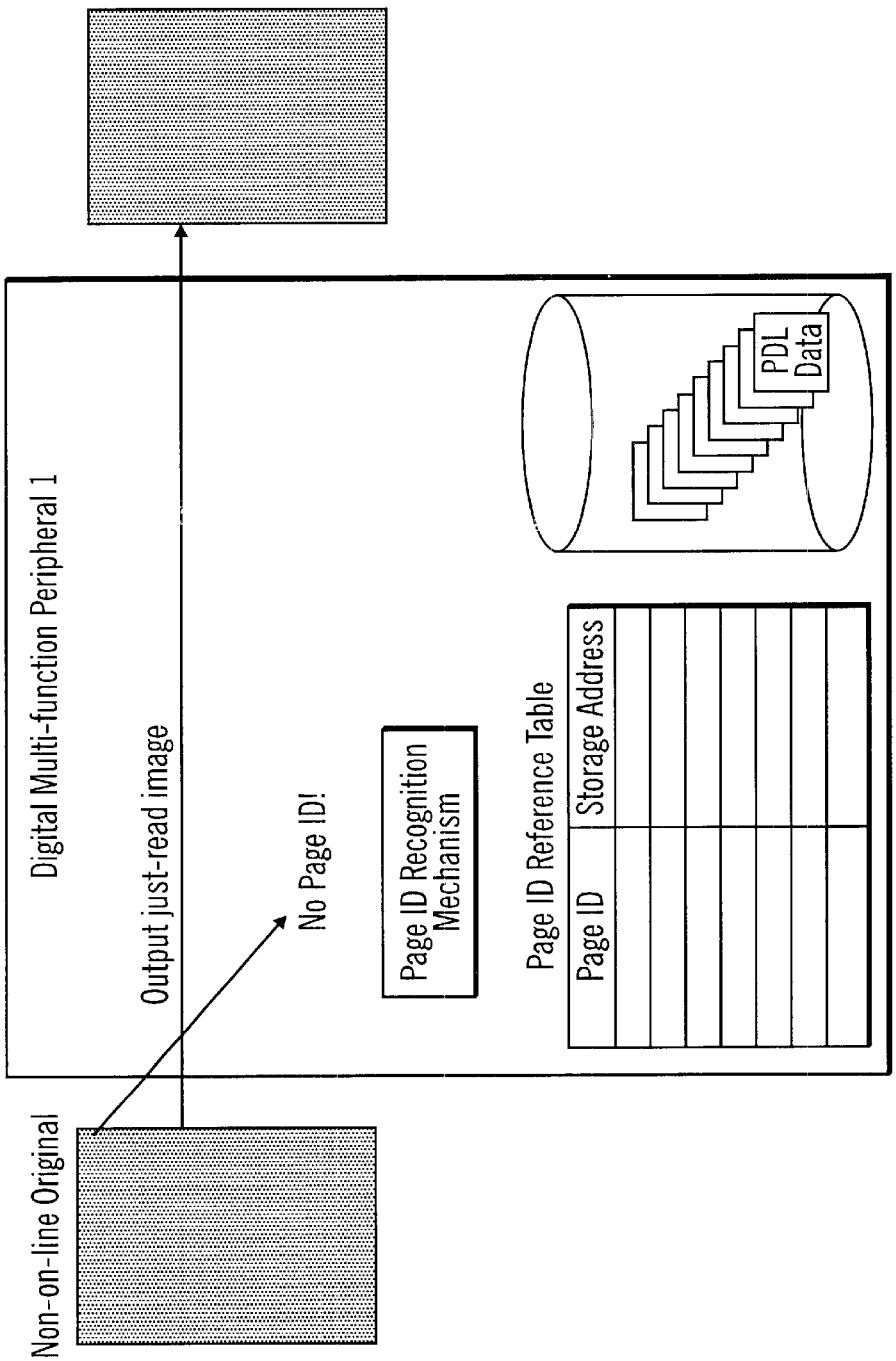
FIG. 9 generally illustrates a copying operation performed by the digital MFP 1 and, more particularly, an operation where a copy original that is not a master page (nonon-line original) is received.

Referring now to FIG. 9, there is shown a copying operation when an original which is not a master page is received. When an image of one page of the original is read by the digital scanner 400, the image processor 32 works on the scanned image to form one page of print image, and the page ID recognizer 71 then determines whether a graphic code indicating the page ID (a bar code in this example) exists in the print image. An original to be copied or sent from which a graphic code indicating the page ID is absent is, in short, an original that is not a master page. The image data of the original that is not a master page are not in PDL format, and thus are not adapted for transmission over the network unchanged. For this reason, an original or a transmission original that is not a master page is called a "nonon-line original" hereinafter in this specification. When an original to be copied which is a nonon-line original is received, the print image generated from the scanned image obtained by the digital scanner 400 is delivered to the printer member 100 unchanged for execution of the copying operation by the digital copier controller 300 in the digital MFP 1.

Figure 10:
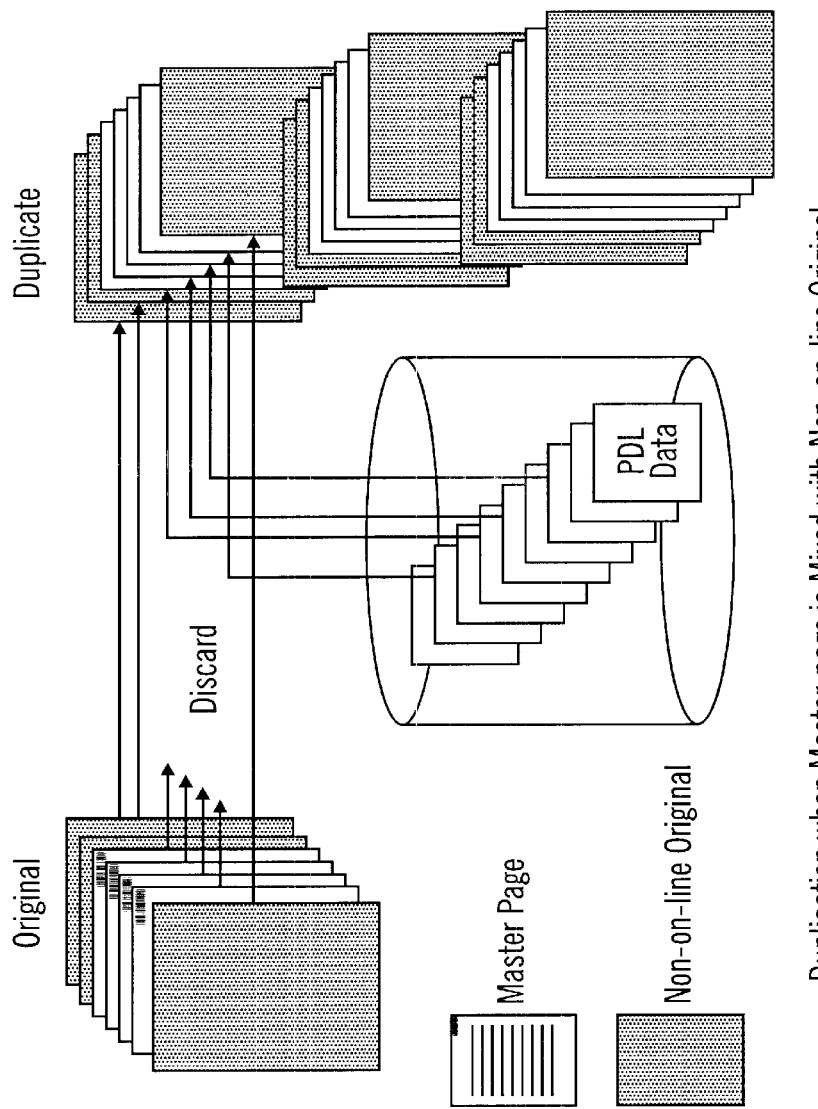
FIG. 10 generally illustrates a copying operation performed by the digital MFP 1 and, more particularly, an operation where multiple sets of pages of originals to be copied are received with pages of a master and a nonon-line original mixed together.

Referring now to FIG. 10, there is shown a copying operation when multiple pages of an original in which a master page and nonon-line original are mixed together are received. As shown in FIG. 10, when a page that is a nonon-line original is received, a print image generated from the scanned image is copied unchanged. On the other hand, when a page that is a master page is received, the scanned image obtained by the scanner 400 is discarded and, in place thereof, printing data read from the hard disk 90 are printed. Even for the master page, a print image generated from the scanned image is copied unchanged for those pages which are not stored in the storage. The same is true for making multiple sets of copies. It should be fully understood that when a master page is copied, saved PDL data are printed instead of copying the scanned image so that the output has the same original print quality as the master page.

Because scanned images generally include reading errors and noise, the print quality is progressively degraded if the scanned image is used repeatedly. It is again emphasized that saved printing data are used in preference to the scanned image just read in by the scanner 400 so that the print quality of the original will be maintained. The copying process described above, that is, the process of reproduction from the master page, is performed page by page. The sequence in which pages are reproduced is totally independent of the sequence in which the master page is stored on the hard disk 90. Thus, even if the pages of the master page are reordered or a necessary page is selected or neglected, the original to be copied can be reproduced in the sequence of reordered pages.

Also, even if some of the pages are modified for replacement with master-page printed pages, the modified pages can be reproduced precisely. In addition, even if a master is placed on a scanner mixed together with pages of a nonon-line original, the pages of the master are reproduced exactly on the basis of the printing data of the original. There is no need for an operator to worry about replacement of the master pages or a random mixture of its pages with a nonon-line original in the copying operation.

Facsimile Transmission Operation

Figure 11:
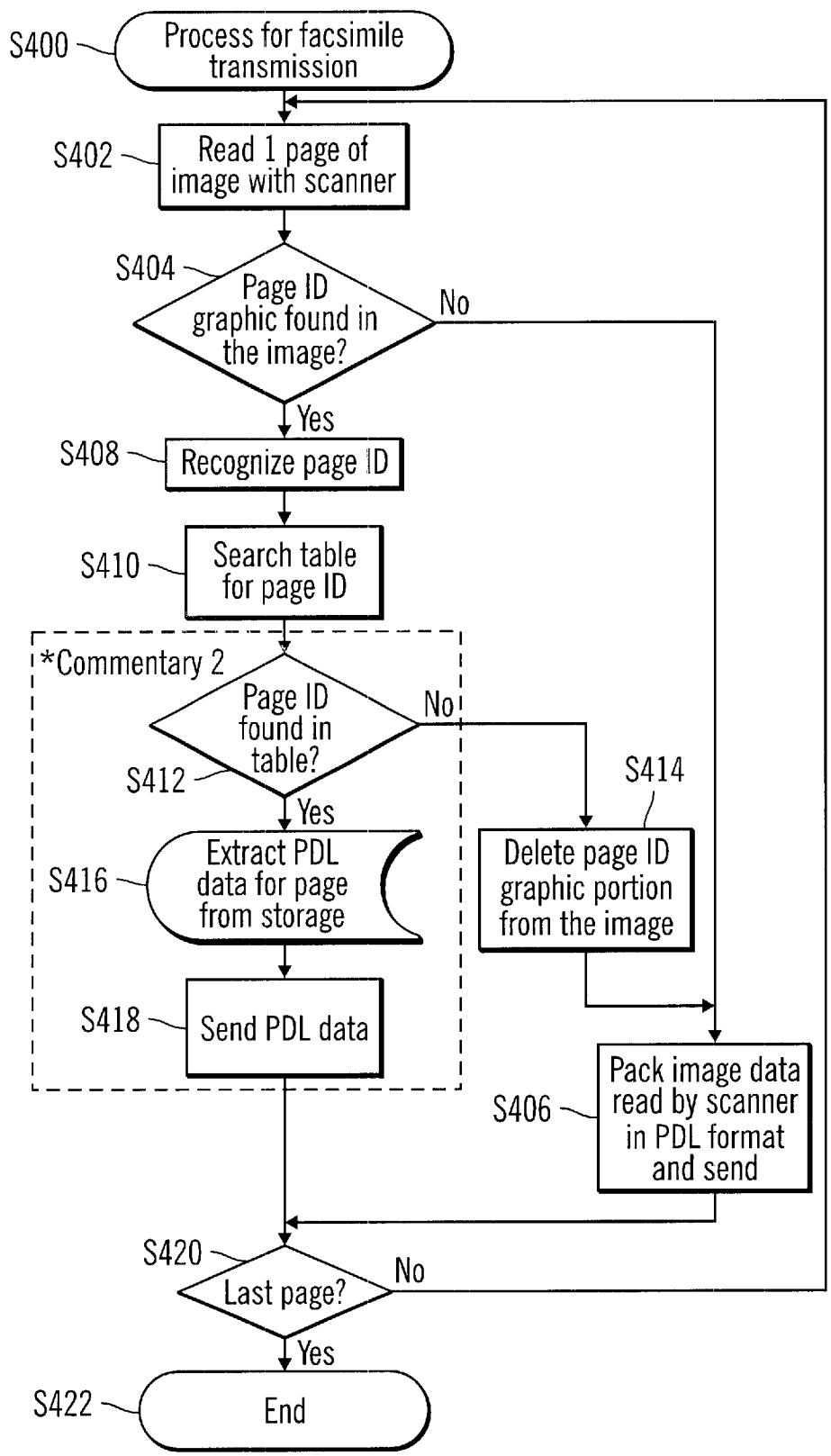
FIG. 11 is a flowchart showing the process steps of a facsimile sending operation performed by the digital MFP 1.

The characteristic power of the digital MFP 1 of this embodiment will also be demonstrated in facsimile transmission. FIG. 11 shows in the form of a flowchart the processing steps when the digital MFP 1 performs a facsimile transmission operation. The operation is started by specifying an address to which the facsimile is to be transmitted, and issuing an instruction to start facsimile transmission on the operator control panel 500 while a facsimile transmission original is placed on the digital scanner 400 (step S400). The digital scanner 400 reads images of the facsimile transmission original document page by page, while the digital copier controller 300 gets one page of the scanned image (step S402). The page ID recognizer 71, upon receiving one page of the print image, first determines whether a graphic code indicating the page ID exists in the screen (step S404).

If a graphic code indicating the page ID is not found in the screen, the original to be sent is not a master page; that is, the digital MFP 1 does not contain therein the printing data of that page. Thus, the page ID recognizer 71 delivers the print screen prepared from the scanned image to the imaging processor 85 unchanged. The imaging processor 85 encloses the image in a PDL format to form facsimile data and delivers it to facsimile sender 83. The facsimile sender 83 sends the facsimile data to the network through the bidirectional network interface 600 (output part 62) (step S406). It should be specifically noted that the facsimile data are enclosed in a PDL format.

If a graphic code indicating the page ID is found in the screen, the page ID recognizer 71 further recognizes the page ID indicated by the graphic code (step S408) and searches the page ID reference table for that page ID (step S410). If the page ID exists in the print image but is not recorded in the page ID reference table, the hard disk 90 does not currently contain therein the printing data corresponding to that page. Thus, the page ID recognizer 71 delivers the image prepared from the scanned image to the imaging processor 85 unchanged. The imaging processor 85 encloses the image in a PDL format to form facsimile data and delivers it to the facsimile sender 83. The facsimile sender 83 sends the facsimile data to the network through the bidirectional network interface 600 (output part 62) (steps S412 , . . . , S406).

A situation in which the page ID is not found in the page ID reference table occurs when the transmission original read by the scanner 400 is a master page generated by another digital MFP or was a master page printed on the same digital MFP a considerable time before. As a result, the corresponding PDL data on the hard disk 90 have already been lost owing to the FIFO scheme and, correspondingly, the page ID has also been discarded from the page ID reference table. In this case, it is preferable to delete the graphic code portion deleted from the facsimile data because the graphic code in the facsimile transmission original will make no sense to the digital MFP 1 (step S414). It should be fully noted that the facsimile data are enclosed in a PDL format.

If the page ID existing in the print image is found in the page ID reference table, this means that an original to be sent placed on the scanner 400 is a master page and that the printing data thereof are recorded in the digital MFP 1. Thus, the page ID controller 74 retrieves the facsimile data from the corresponding storage address on the hard disk 90 to deliver them to the facsimile sender 83 (step S416). The facsimile sender 83 sends the received PDL data to the network through the bidirectional network interface 600 (output part 62) (step S418). In other words, PDL data equivalent to the master page will be sent to the destination.

When the facsimile sending process for one page has been completed with step S418 or S406, it is determined whether the facsimile sending process has been completed down to the last page; that is, whether any original to be sent is still placed on the digital scanner 400. If an original is still left on the scanner 400, the system returns to step S402 and the above process is repeated. If all originals have passed through the same process, the routine ends (step S422).

Figure 12:
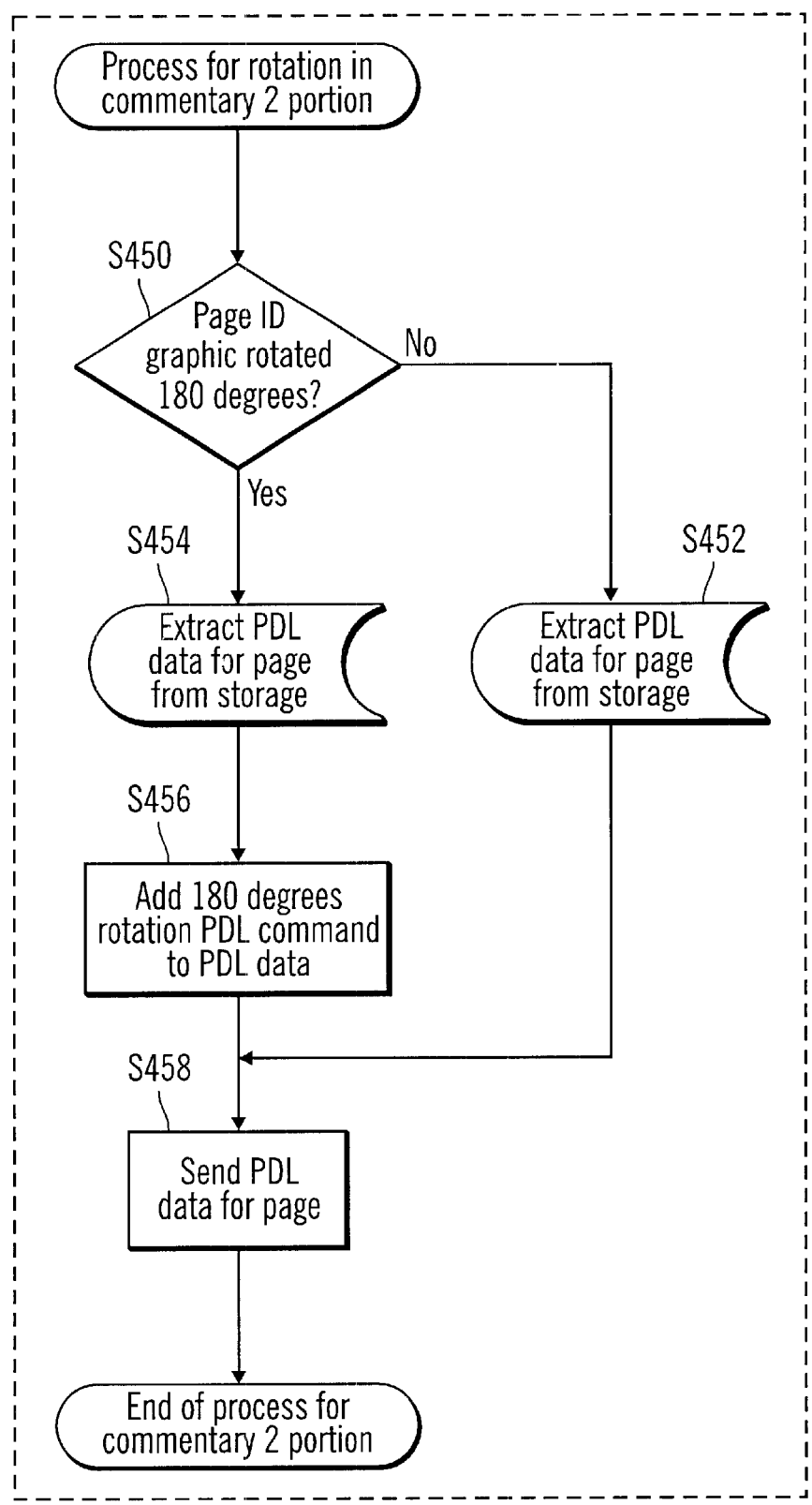
FIG. 12 is a flowchart showing the process steps of a facsimile sending operation performed by the digital MFP 1 and, more particularly, another example of operations performed when the master page is placed with its orientation rotated through 180 degrees.

An operator may want to send a facsimile original rotated through 180 degrees (i.e., upside down). According to the digital MFP 1 of this embodiment, facsimile data can be sent with the same orientation as the original and with the original print quality maintained by simply placing the master page on the digital scanner 400 with the page rotated through 180 degrees. This process, however, requires that steps S412, S416, and S418, which are surrounded by a dotted line in the flowchart of FIG. 11, be replaced with the steps in FIG. 12, which will be described below.

The page ID recognizer 71, upon finding the page ID recognized in the print image in the page ID reference table, determines the presence or absence of a graphic code indicating that the page ID is rotated through 180 degrees on the print image (step S450). If the graphic code is not rotated through 180 degrees, that is, if the master page is placed on the scanner 400 with the normal orientation, the page ID controller 74 retrieves printing data from the corresponding storage address on the hard disk 90 to deliver it to the facsimile sender 83 (step S452). The facsimile sender 83 then sends the received PDL data to the network through the bidirectional network interface 600 (output part 62) (step S458). As a result, the PDL data equivalent to the master page are sent in the normal orientation.

Figure 13:
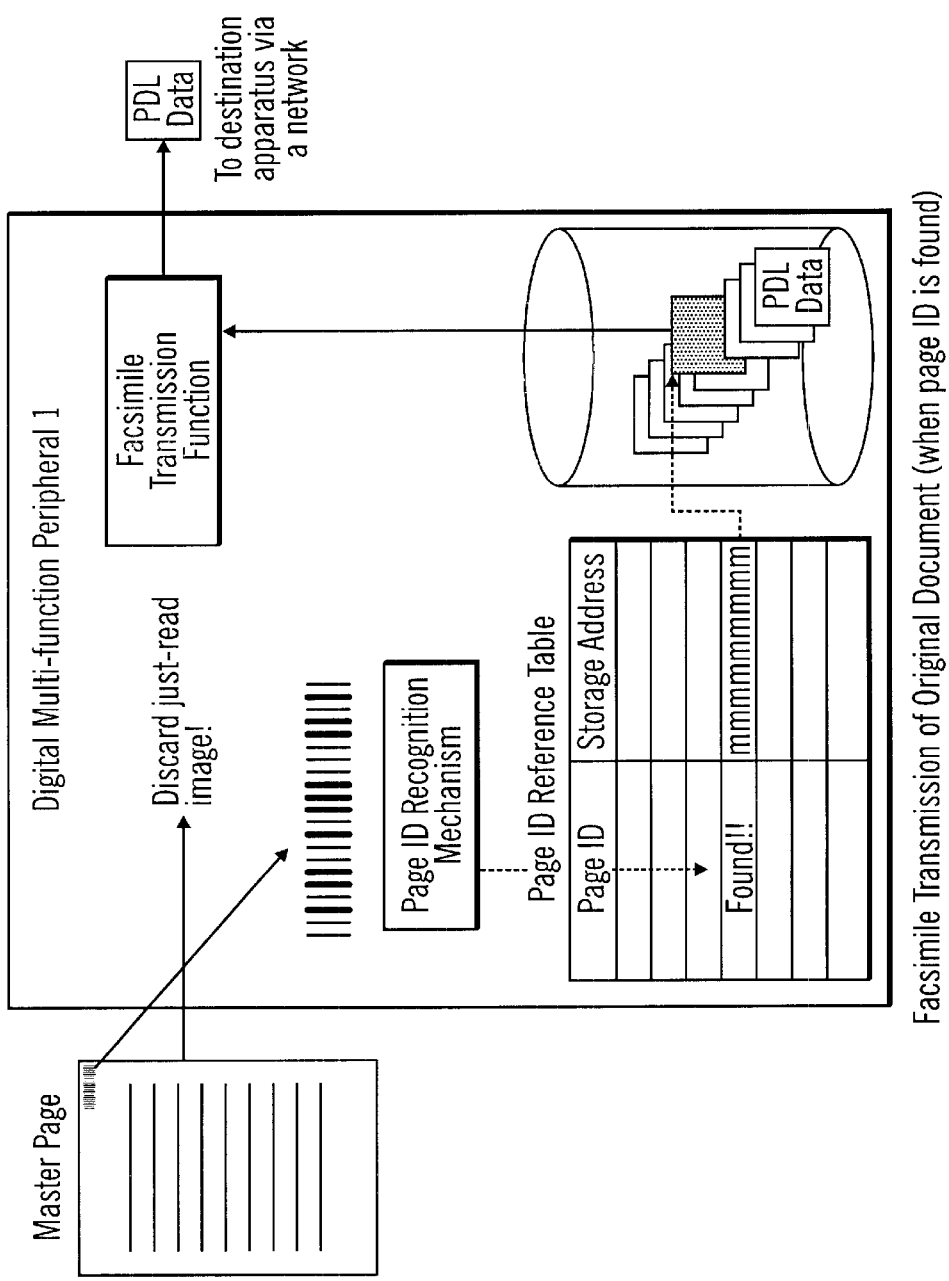
FIG. 13 generally illustrates a facsimile sending operation performed by the digital MFP 1 and, more particularly, an operation where a master page with a page ID registered in the page reference table is received.

If the graphic code is rotated through 180 degrees, that is, if the master page is placed on the scanner 400 with an orientation opposite the normal orientation, the page ID controller 74 retrieves printing data from the corresponding storage address on the hard disk 90 to deliver it to the facsimile sender 83 (step S454). The facsimile sender 83 then attaches to the printing data of PDL format a PDL command to rotate through 180 degrees (step S456) for delivery to the bidirectional network interface 600 (output part 62). As a result, PDL data equivalent to the master page are sent out to the network with an orientation opposite the normal orientation (step S458). FIG. 13 generally illustrates the facsimile sending operation when a master page having a page ID registered in the page ID reference table is received.

When an image of one page of the original to be sent is read by the digital scanner 400, the image processor 32 works on the scanned image to form one page of print image and the page ID recognition mechanism part 71 then determines whether a graphic code indicating the page ID (a bar code in this example) exists in the print image. If a graphic code is found, the page ID reference table is searched for the page ID indicated by the graphic code. If the page ID is found, the scanned image just read from the scanner 400 is discarded and, in place thereof, PDL data read from the corresponding storage address on the hard disk 90 are delivered to the facsimile sender 83 for transmission to a destined device (e.g., another digital MFP or PC) via a network. As a result, PDL data describing the master page itself are sent rather than the scanned image of the transmission original. That is, the facsimile data received at the destination will have the original print quality equivalent to that of the master page.

If a graphic code indicating the page ID exists in the transmission original but that the page ID is not found in the page ID reference table, facsimile data generated from the scanned image of the transmission original are sent according to an operation substantially the same as the copying operation in FIG. 8.

Figure 14:
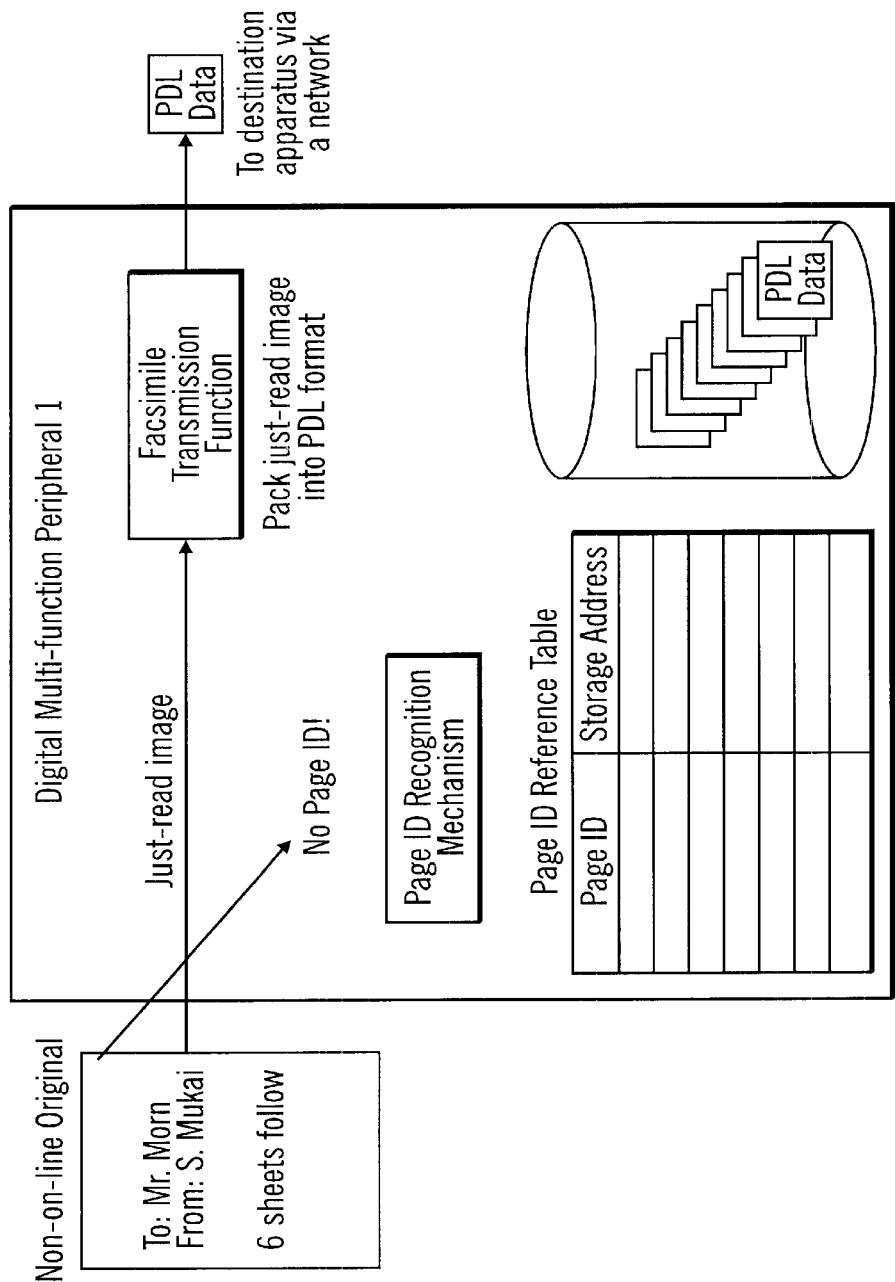
FIG. 14 generally illustrates a facsimile sending operation performed by the digital MFP 1 and, more particularly, an operation where an original that is not a master page (nonon-line original) is received.

Referring now to FIG. 14, there is shown a facsimile sending operation when a facsimile transmission original (i.e., a nonon-line original) is not received. When an image of one page of the original to be sent is read by the digital scanner 400, the image processor 32 works on the scanned image to form a print screen and the page ID recognition mechanism part 71 then determines whether a graphic code indicating the page ID (a bar code in this example) exists in the print image.

An original to be sent from which a graphic code indicating the page ID is absent is, in short, a nonon-line original that is not a master page. A handwritten cover page (indication) is an example of a nonon-line original in facsimile transmission. The image data for such nonon-line originals are not enclosed in PDL format and cannot be transmitted over the network unchanged. When a page that is a nonon-line original is received, the print image generated from the scanned image of the digital scanner 400 are enclosed in PDL format by the imaging processor 85, and facsimile data formed as PDL data are then transmitted to a destination (e.g., another digital MFP or a PC) by the facsimile sender 83 via a network.

The facsimile process described above, that is, the process of reproducing the master page, is performed page by page. The sequence in which pages are reproduced is totally independent of the sequence in which the pages of the master are stored on the hard disk 90. Thus, even if the pages of the master are reordered or a particular page is selected or neglected, the transmission original can be sent to the facsimile destination with the reordered sequence of pages. Also, even if some of the pages are modified and replaced, the modified pages can be transmitted precisely in the same order as the originals. In addition, even if the pages of a master are placed on a scanner 400 mixed together with pages of a nonon-line original, the pages of the master are reproduced exactly on the basis of the printing data for the original. There is no need for an operator to worry about replacement of the master page or random mixture of its pages with those of a nonon-line original.

Document Filing Operation to the Database on the Network

The characteristic power of the digital MFP 1 of this embodiment is also demonstrated in document filing transmission to the database on a network. A database on a network here includes a database server provided on a network, such as the Internet and an Intranet or a local disk of a database server. The local disk may, for example, be a large-capacity storage device such as a hard disk or an optical disk, and may be called a "remote disk".

Figure 15:
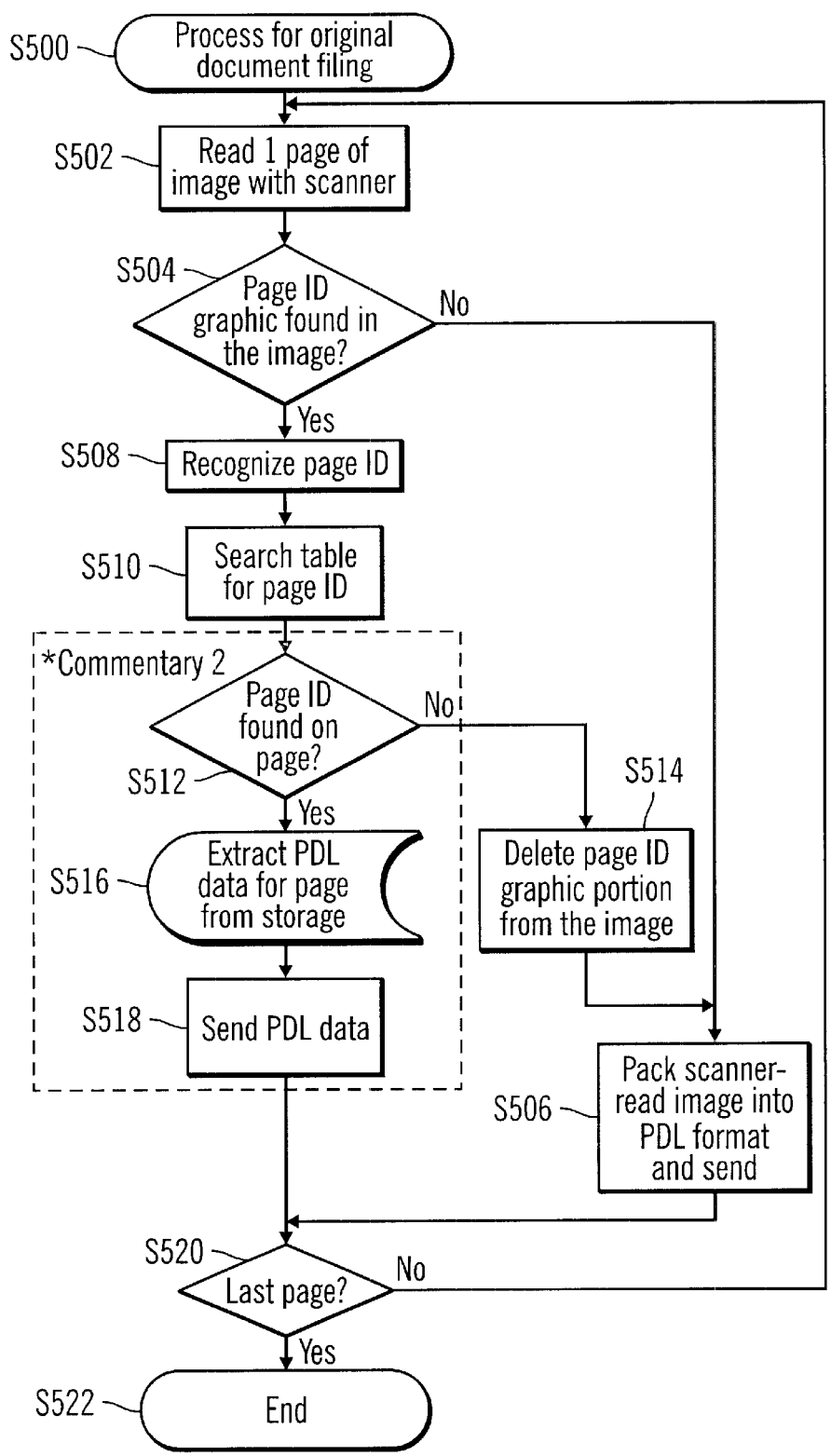
FIG. 15 is a flowchart showing the process steps of a document filing operation to a remote disk performed by the digital MFP 1.

Referring now to FIG. 15, there is shown a flowchart of the processing steps when the digital MFP 1 performs a document filing operation to a database server (remote disk) on the network. The process starts by specifying the address to which the file is to be transferred (the database server) and issuing an instruction to start document filing on the operator control panel 500, while the document (original) for filing is placed on the digital scanner 400 (step S500).

The digital scanner 400 reads an image of the document to be filed page by page, while the digital copier controller 300 works on the scanned image to successively generate one page of image (step S502). The page ID recognizer 71, upon receiving one page of the print image, first determines whether a graphic code indicating the page ID exists in the print image (step S504).

If a graphic code indicating the page ID is not found in the screen, the original to be filed is no longer a master page; that is, the digital MFP 1 does not contain therein the printing data of that page. Thus, the page ID recognizer 71 delivers the print image prepared from the scanned image of the scanner 400 to the imaging processor 85. The imaging processor 85 encloses the image in a PDL format to form a document file and delivers it to the document file sender 84. The document file sender 84 sends the PDL data to the network through the bidirectional network interface 600 (output part 62) (step S506). It should be specifically noted that the document file is enclosed in a PDL format.

If the page ID exists in the image but is not recorded in the page ID reference table, the digital MFP 1 does not currently contain therein the printing data corresponding to that page. Thus, the page ID recognizer 71 delivers the image generated from the scanned image captured by the scanner 400 to the imaging processor 85. The imaging processor 85 encloses the image in a PDL format to form a document file and delivers it to document file sender 84. The document file sender 84 sends the document file to the network through the bidirectional network interface 600 (output part 62) (steps S512 , . . . , S506). A situation in which the page ID is not found in the page ID reference table occurs when the document to be filed and read by the scanner 400 is a master page generated by another digital MFP or was master-page printed on the same digital MFP a considerable time before. As a result, the corresponding PDL data on the hard disk 90 has already been lost owing to the FIFO scheme and, correspondingly, the page ID has also been discarded from the page ID reference table. In this case, it is preferable to delete the graphic code portion deleted from the document file because the graphic code in the document file will make no sense to the digital MFP 1 (step S514). It should be fully noted that the document file is enclosed in a PDL format.

When the page ID existing in the screen is found in the page ID reference table, this means that the document for filing placed on the scanner 400 is a master page and that the print data thereof are recorded in the digital MFP 1. Therefore, the page ID controller 74 retrieves the print data from the corresponding storage address on the hard disk 90 to deliver it to the document file sender 84 (step S516). The document file sender 84 sends the received PDL data to the network through the bidirectional network interface 600 (output part 62) (step S518). In other words, PDL data equivalent to the master page will be transferred to the remote disk as a page of a document file.

When the document file-sending process of one page has been completed with step S518 or S506, it is determined whether the facsimile sending process has been completed down to the last page; that is, whether any document to be filed is still left on the digital scanner 400. If a document is still left on the scanner 400, the system returns to step S502 and the above process is repeated. If all the documents have been processed through the same process, the routine ends (step S522).

An operator may wish to send a document to be filed with the original rotated through 180 degrees (i.e., upside down). According to the digital MFP 1 of this embodiment, a document file can be sent with the same orientation as the document to be filed and with the original print quality maintained by simply placing the master page on the digital scanner 400 with the page rotated through 180 degrees. This process, however, requires that steps S512, S516, and S518, which are surrounded by a dotted line in the flowchart of FIG. 15, are modified. However, the modification is substantially the same as FIG. 12.

Figure 16:
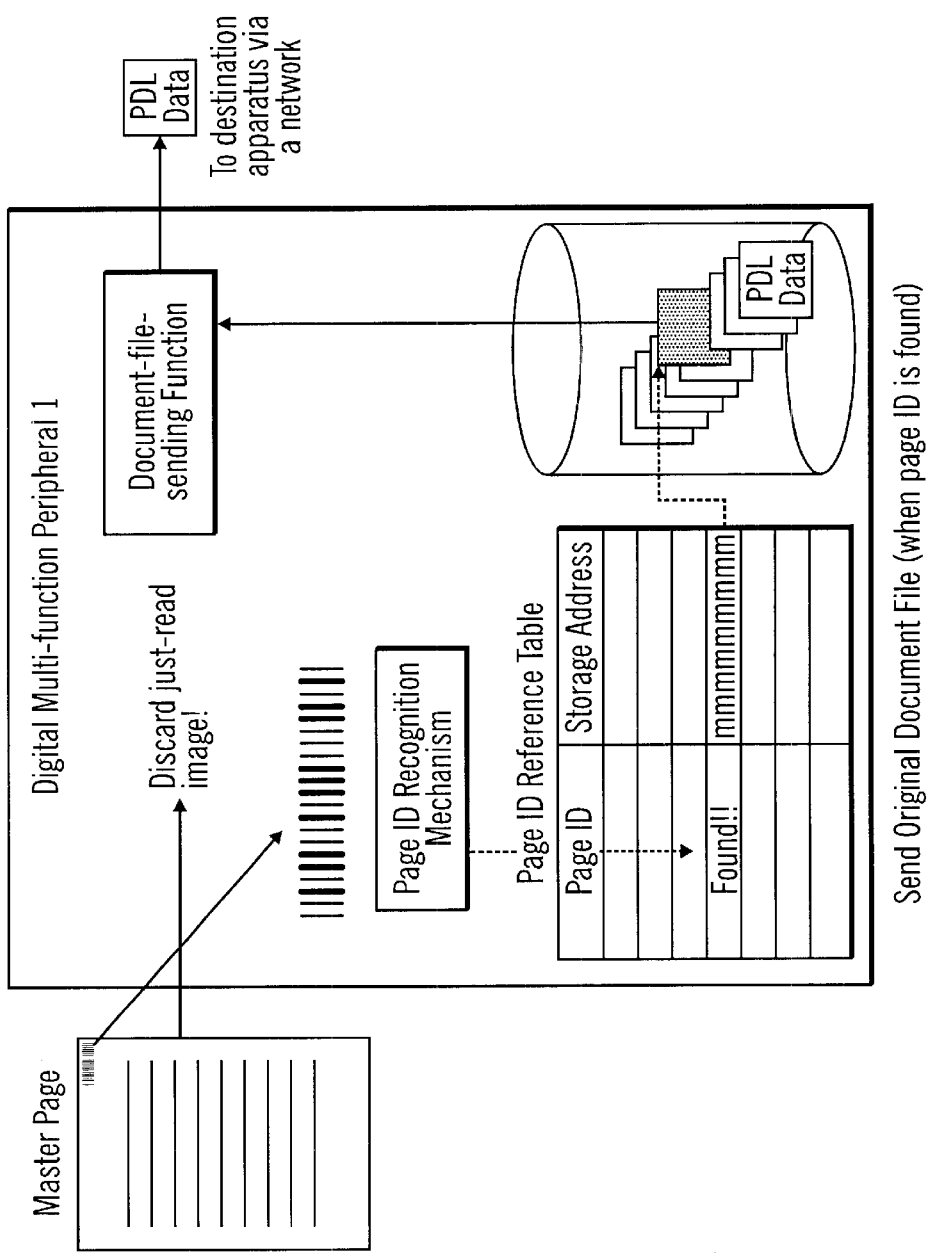
FIG. 16 generally illustrates a document filing operation to a remote disk performed by the digital MFP 1 and, more particularly, an operation where a master page with a page ID registered in the page ID reference table is received.

Referring now to FIG. 16, there is shown a document filing operation when a master page with a page ID registered in the page ID reference table is received. When an image of one page of the document to be filed is read by the digital scanner 400, the image processor 32 works on the scanned image to form a screen, and the page ID recognition mechanism part 71 then determines whether a graphic code indicating the page ID (a bar code in this example) exists in the screen. If a graphic code is found, the page ID reference table is searched for the page ID indicated by the graphic code. If the page ID is found, the scanned image just read in is discarded and, in place thereof, PDL data read from the corresponding storage address on the hard disk 90 are delivered to the document file sender 84 for transmission to a destined device (e.g., a database server) via a network.

As a result, PDL data describing the master page itself is transferred instead of the scanned image of the document to be filed. That is, the document file received at the destination will have the original print quality equivalent to that of the master page. If the graphic code indicating the page ID exists in the filing document placed on the scanner 400 but that page ID is not found in the page ID reference table, a document file generated from the scanned image of the document to be filed is sent according to an operation similar to the copying operation in FIG. 8.

Figure 17:
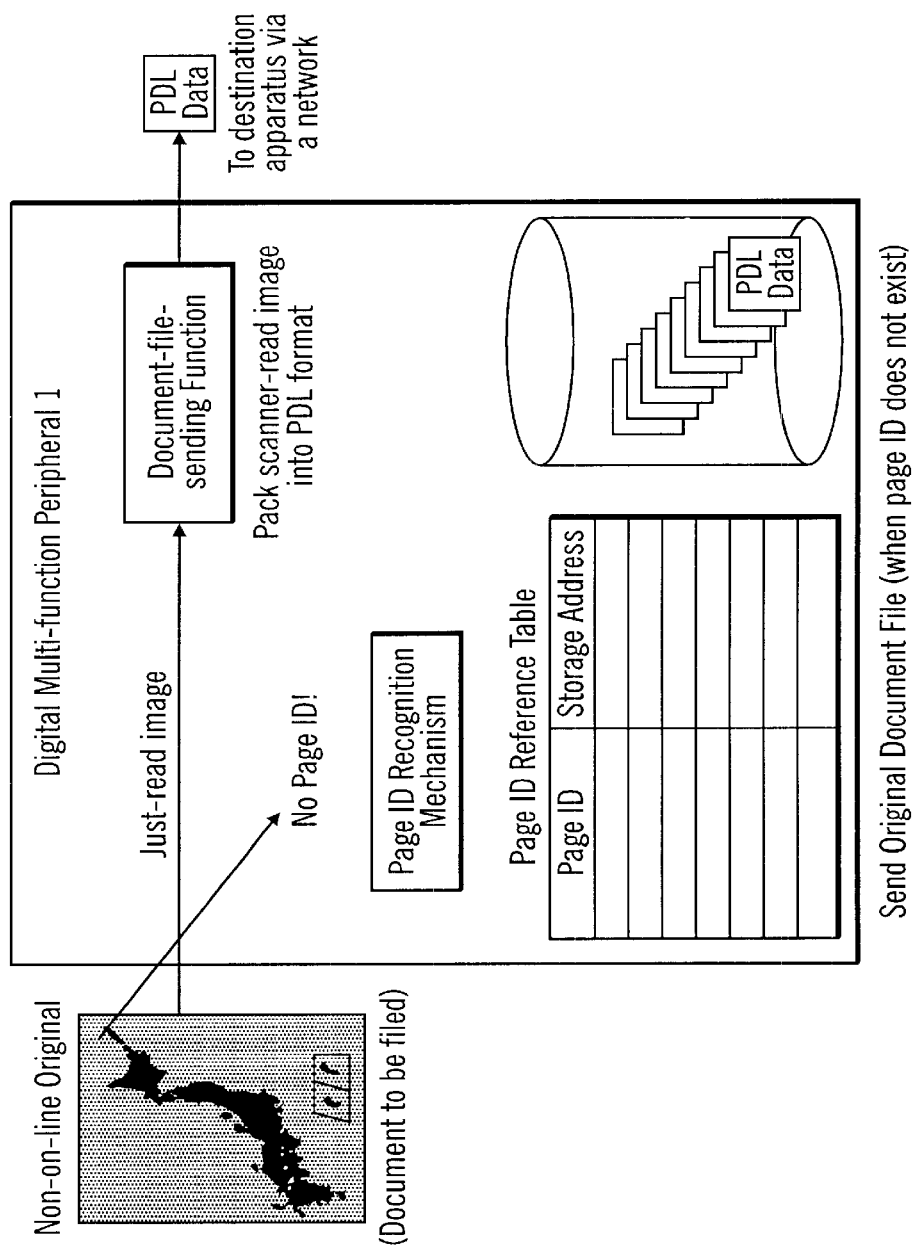
FIG. 17 generally illustrates a document filing operation performed by the digital MFP 1 and, more particularly, an operation where an original that is not a master page (nonon-line original) is received.

Referring now to FIG. 17, there is shown the document filing operation when a document to be filed which is not a master page (i.e., a nonon-line original) is received. When an image of one page of the document to be filed is read by the digital scanner 400, the image processor 32 processes the scanned image to form an image, and the page ID recognizer 71 then determines whether a graphic code indicating the page ID (a bar code in this example) exists in the screen.

A document to be filed, from which a graphic code indicating the page ID is absent is an original, is not a master page. The image data of an original that is not a master page is a "nonon-line original" that is not enclosed in PDL formats and cannot be transferred through the network unchanged. If a page that is a nonon-line original is received, the screen generated from the scanned image of the digital scanner 400 is enclosed in a PDL format by the imaging processor 85, and the document file formatted as PDL data is then transmitted to a destination (e.g., a database server) via a network by the document file sender 84.

Because a scanned image generally includes reading errors and noise, the print quality is progressively degraded if the scanned image is used repeatedly. In the digital MFP 1 of this embodiment, the print quality of the original is maintained because already saved printed data are used in preference to the scanned image captured by the scanner 400. Also, because the facsimile data are sent unchanged in PDL format rather than as a scanned image, the volume of data is reduced and the network communication load is reduced. In addition, the digital MFP 1 in the receiving side independently generates an image by using source data. Consequently, the original print quality is maintained on the receiving side.

While this invention has been described in detail with reference to a specific embodiment, it should, however, be understood that modifications and alternations of the embodiment are obvious to those skilled in the art without departing from the spirit of this invention.

What is claimed is:

1. A multifunction processor for managing a page-responsive hardcopy and softcopy reproduction and retransmission facility, comprising:
   (a) a page-oriented storage arrangement, said pages stored therein being addressable by identification indicia (ID);
   (b) an input mechanism including an optical scanner for electronically imaging a hardcopy original page or receiving an electronic page image from an extrinsic source;
   (c) a first logic arrangement coupling the input mechanism for ascertaining from the electronic page image the presence of any page ID and providing signal indication of either the absence of an ID on the page or a digital representation thereof;
   (d) a second logic arrangement for comparison matching the ascertained ID with the ID of any of the page images recorded in the storage arrangement;
   (e) a page replication arrangement coupling the storage arrangement, the input mechanism, and the first and second logic arrangements; and
      (1) responsive to the absence of any ascertained ID on the page or in the presence of a comparison indicia mismatch, for reproducing in hardcopy or for transmitting the electronic page image in softcopy; and
      (2) responsive to the presence of a comparison indicia match, for accessing the previously recorded electronic image with the same page ID from the storage arrangement, and for either reproducing said accessed image in hardcopy or for transmitting the accessed image in softcopy; and
   (f) a fourth logic arrangement responsive to a signal indication from the first logic arrangement of the absence of an ID on the current page image for selectively embedding a predetermined ID within the page image, and for causing the second logic arrangement to comparison match as if the ID had originally been ascertained from the current page image.

2. A method for managing data in a data reproduction facility, comprising:
   receiving a request to output a digital representation of a print image;
   reading a unique identifier from the received digital representation, wherein the read unique identifier is displayed with the print image when the print image is rendered on a print media;
   determining whether the read unique identifier matches one of a plurality of registered unique identifiers, wherein each registered unique identifier is associated with one print file in storage including a print image, and wherein the registered unique identifier associated with the print file is displayed with the print image in the print file when the print file is rendered on print media; and
   if the read unique identifier matches one registered unique identifier, then retrieving the print file associated with the unique identifier to output to render on print media.

3. The method of claim 2, wherein a comparison mismatch results either from a noncorrespondence between the read unique identifier and one registered unique identifier or when the received digital representation does not include one unique identifier.

4. The method according to claim 2 wherein reading the unique identifier further comprises processing a back of a page of a rendering of the received digital representation for the unique identifier.

5. The method according to claim 2 wherein the print file is in a PDL format.

6. The method of claim 2, wherein the digital representation comprises a scanned image of the print media including the print image and the unique identifier.

7. The method of claim 2, further comprising:
   if the received digital representation does not include the unique identifier, then outputting the received digital representation for rendering on the print media.

8. The method of claim 2, further comprising:
   if the read unique identifier does not match one registered unique identifier, then outputting the received digital representation of the print image and the unique identifier for rendering on the print media.

9. The method of claim 2, wherein the unique identifier is embedded in the print image in the received digital representation and wherein the registered unique identifier is embedded in the print image in the associated print file.

10. The method of claim 9, wherein the unique identifier and registered unique identifiers are embedded at a predetermined location within the print images.

11. A method for managing data in a data reproduction facility, comprising:
   receiving a request to output digital representations of print images for pages of a document, wherein at least one of the digital representations includes one unique identifier that matches one registered unique identifier and wherein at least one of the digital representations does not include one unique identifier;
   reading a unique identifier from the received digital representations that include a unique identifier, wherein the read unique identifier is displayed with the print image when the print image is rendered on a print media;
   determining whether the read unique identifier marches one of a plurality of registered unique identifiers, wherein each registered unique identifier is associated with one print file in storage including a print image, and wherein the registered unique identifier associated with the print file is displayed with the print image in the print file when the print file is rendered on print media;
   if the read unique identifier matches one registered unique identifier, then retrieving the print file associated with the unique identifier to output to render on print media; and
   if the read unique identifier does not match one registered unique identifier, then outputting the received digital presentation of the print image and the unique identifier for rendering on the print media.

12. The method of claim 11, wherein a sequence in which the digital representations of the pages are outputted is independent of a sequence in which the print files having the print image for the pages are stored.

13. A method for managing data in a data reproduction facility, comprising:
   receiving a request to output a digital representation of a print image;
   reading a unique identifier from the received digital representation, wherein the read unique identifier is displayed with the print image when the print image is rendered on a print media;
   determining whether the read unique identifier matches one of a plurality of registered unique identifiers, wherein each registered unique identifier is associated with one print file in storage including a print image, and wherein the registered unique identifier associated with the print file is displayed with the print image in the print file when the print file is rendered on print media;

if the read unique identifier matches one registered unique identifier, then retrieving the print file associated with the unique identifier to output to render on print media;

if the read unique identifier does not match one registered unique identifier, then outputting the received digital representation of the print image and the unique identifier for rendering on the print media; and before outputting the received digital representation, removing the unique identifier from the received digital representation to produce a modified digital representation if the read unique identifier does not match one registered unique identifier, wherein rendering the e modified digital representation would display the print image without the unique identifier.

14. A system for managing data in a data reproduction facility, comprising: a storage system;

means for receiving a request to output a digital representation of a print image;

means for reading a unique identifier from the received digital representation, wherein the read unique identifier is displayed with the print image when the print image is rendered on print media;

means for determining whether the read unique identifier matches one of a plurality of registered unique identifiers, wherein each registered unique identifier is associated with one print file stored in the storage system including a print image, and wherein the registered unique identifier associated with the print file is displayed with the print image in the print file when the print file is rendered on print media; and means for retrieving the print file associated with the unique identifier to output for rendering on the print media if the read unique identifier matches one registered unique identifier.

15. The system of claim 14, wherein the digital representation comprises a scanned image of the print media including the print image and the unique identifier.

16. The system of claim 14, further comprising:

means for outputting the received digital representation for rendering on the print media if the received digital representation does not include the unique identifier.

17. The system of claim 14, further comprising:

means for outputting the received digital representation of the print image and the unique identifier for rendering on the print media if the read unique identifier does not match one registered unique identifier.

18. The system of claim 14, wherein the unique identifier is embedded in the print image in the received digital representation and wherein the registered unique identifier is embedded in the print image in the associated print file.

19. The system of claim 18, wherein the unique identifier and registered unique identifiers are embedded at a predetermined location within the print images.

20. A system for managing data in a data reproduction facility, comprising:

a storage system;

means for receiving a request to output digital representations of print images for pages of a document, wherein at least one of the digital representations includes one unique identifier that matches one registered unique identifier and wherein at least one of the digital representations does not include one unique identifier that matches on registered unique identifier;

means for reading a unique identifier from the received digital representation that include one unique identifier, wherein the read unique identifier is displayed with the print image when the print image is rendered on print media;

means for determining whether the read unique identifier matches one of a plurality of registered unique identifiers, wherein each registered unique identifier is associated with one print file stored in the storage system including a print image, and wherein the registered unique identifier associated with the print file is displayed with the print image in the print file when the print file is rendered on print media;

means for retrieving the print file associated with the unique identifier to output for rendering on the print media if the read unique identifier matches one registered unique identifier; and means for outputting the received digital representation of the print image and the unique identifier for rendering on the print media if the read unique identifier does not match one registered unique identifier.

21. The system of claim 20, wherein a sequence in which the digital representations of the pages are outputted is independent of a sequence in which the print files having the print image for the pages are stored.

22. A system for managing data in a data reproduction facility, comprising:

a storage system;

means for receiving a request to output a digital representation of a print image;

means for reading a unique identifier from the received digital representation, wherein the read unique identifier is displayed with the print image when the print image is rendered on print media;

means for determining whether the read unique identifier matches one of a plurality of registered unique identifiers, wherein each registered unique identifier is associated with one print file stored in the storage system including a print image, and wherein the registered unique identifier associated with the print file is displayed with the print image in the print file when the print file is rendered on print media;

means for retrieving the print file associated with the unique identifier to output for rendering on the print media if the read unique identifier matches one registered unique identifier;

means for outputting the received digital representation of the print image and the unique identifier for rendering on the print media if the read unique identifier does not match one registered unique identifier; and means for removing the unique identifier from the received digital representation, before outputting the received digital representation, to produce a modified digital representation if the read unique identifier does not match one registered unique identifier, wherein rendering the modified digital representation would display the print image without the unique identifier.

23. An article of manufacture including code for managing data in a data reproduction facility, wherein the code causes operations to be performed comprising:

receiving a request to output a digital representation of a print image;

reading a unique identifier from the received digital representation, wherein the read unique identifier is displayed with the print image when the print image is rendered on a print media;

determining whether the read unique identifier matches one of a plurality of registered unique identifiers, wherein each registered unique identifier is associated with one print file in storage including a print image, and wherein the registered unique identifier associated with the print file is displayed with the print image in the print file when the print file is rendered on print media; and if the read unique identifier matches one registered unique identifier, then retrieving the print file associated with the unique identifier to output to render on print media.

24. The article of manufacture of claim 23, wherein the digital representation comprises a scanned image of the print media including the print image and the unique identifier.

25. The article of manufacture of claim 23, further comprising:

if the received digital representation does not include the unique identifier, then outputting the received digital representation for rendering on the print media.

26. The article of manufacture of claim 23, further comprising:

if the read unique identifier does not match one registered unique identifier, then outputting the received digital representation of the print image and the unique identifier for rendering on the print media.

27. The article of manufacture of claim 23, wherein the unique identifier is embedded in the print image in the received digital representation and wherein the registered unique identifier is embedded in the print image in the associated print file.

28. The article of manufacture of claim 27, wherein the unique identifier and registered unique identifiers are embedded at a predetermined location within the print images.

29. An article of manufacture including code for managing data in a data reproduction facility, wherein the code causes operations to be performed comprising:

receiving a request to output digital representations of print images for pages of a document, wherein at least one of the digital representations includes one unique identifier that matches one registered unique identifier and wherein at least one of the digital representations does not include one unique identifier;

reading a unique identifier from the received digital representation that include one unique identifier, wherein the read unique identifier is displayed with the print image when the print image is rendered on a print media;

determining whether the read unique identifier matches one of a plurality of registered unique identifiers, wherein each registered unique identifier is associated with one print file in storage including a print image, and wherein the registered unique identifier associated with the print file is displayed with the print image in the print file when the print file is rendered on print media;

if the read unique identifier matches one registered unique identifier, then retrieving the print file associated with the unique identifier to output to render on print media; and if the read unique identifier does not match one registered unique identifier, then outputting the received digital representation of the print image and the unique identifier for rendering on the print media.

30. The article of manufacture of claim 29, wherein a sequence in which the digital representations of the pages are outputted is independent of a sequence in which the print files having the print image for the pages are stored.

31. An article of manufacture including code for managing data in a data reproduction facility, wherein the code causes operations to be performed comprising:

receiving a request to output a digital representation of a print image;

reading a unique identifier from the received digital representation, wherein the read unique identifier is displayed with tile print image when the print image is rendered on a print media;

determining whether the read unique identifier matches one of a plurality of registered unique identifiers, wherein each registered unique identifier is associated with one print file in storage including a print image, and wherein the registered unique identifier associated with the print file is displayed with the print image in the print file when the print file is rendered on print media;

if the read unique identifier matches one registered unique identifier, then retrieving the print file associated with the unique identifier to output to render on print media;

if the read unique identifier does not match one registered unique identifier, then outputting the received digital representation of the print image and the unique identifier for rendering on the print media; and before outputting the received digital representation, removing the unique identifier from the received digital representation to produce a modified digital representation if the read unique identifier does not match one registered unique identifier, wherein rendering the modified digital representation would display the print image without the unique identifier.

* * * * *

UNITED STATES PATENT AND TRADEMARK OFFICE
CERTIFICATE OF CORRECTION

PATENT NO. : 6,466,329 B1
DATED : October 15, 2002
INVENTOR(S) : Shunichi Mukai

It is certified that error appears in the above-identified patent and that said Letters Patent is hereby corrected as shown below:

Column 22,
Line 36, delete "marches" insert -- matches. --

Column 23,
Line 17, delete "e."
Line 21, after ":" begin new paragraph.

Column 26,
Line 28, delete "tile" insert -- the --.

Signed and Sealed this

Fifth Day of April, 2005

JON W. DUDAS
*Director of the United States Patent and Trademark Office*